UNIVERSAL LINE CONCENTRATOR

Filed May 21, 1957 14 Sheets-Sheet 1

INVENTOR
W. O. FLECKENSTEIN
BY Harold C. Herman
ATTORNEY

INVENTOR
W. O. FLECKENSTEIN
BY
Harold C. Herman
ATTORNEY

INVENTOR
W. O. FLECKENSTEIN
BY Harold C. Herman
ATTORNEY

INVENTOR
W. O. FLECKENSTEIN
BY Harold C. Herman
ATTORNEY

Dec. 8, 1959 W. O. FLECKENSTEIN 2,916,557

UNIVERSAL LINE CONCENTRATOR

Filed May 21, 1957 14 Sheets-Sheet 5

INVENTOR
W. O. FLECKENSTEIN
BY
Harold C. Herman
ATTORNEY

INVENTOR
W. O. FLECKENSTEIN
BY Harold C. Herman
ATTORNEY

INVENTOR
W. O. FLECKENSTEIN
BY
Harold C. Hersman
ATTORNEY

INVENTOR
W. O. FLECKENSTEIN
BY Harold C. Herman
ATTORNEY

INVENTOR
W. O. FLECKENSTEIN
BY
Harold C. Herman
ATTORNEY

INVENTOR
W. O. FLECKENSTEIN
BY Harold C. Herman
ATTORNEY

INVENTOR
W. O. FLECKENSTEIN
BY
Harold C. Herman
ATTORNEY

Dec. 8, 1959 W. O. FLECKENSTEIN 2,916,557

UNIVERSAL LINE CONCENTRATOR

Filed May 21, 1957 14 Sheets-Sheet 12

INVENTOR
W. O. FLECKENSTEIN
BY Harold C. Herman
ATTORNEY

Dec. 8, 1959 W. O. FLECKENSTEIN 2,916,557

UNIVERSAL LINE CONCENTRATOR

Filed May 21, 1957 14 Sheets-Sheet 13

| FOR SUBS. LINE NOS. | IN VERT. GRP. NO. | LINE UNIT 0 TO TRUNK NO. | 1 | 2 | 3 | 4 | 5 | TRUNK PREF. |
|---|---|---|---|---|---|---|---|---|
| 00-04 | 0 | 1 | 6 | 0 | 7 | 8 | 9 | 0,1,7,6,8,9 |
| 05-09 | 1 | 3 | 4 | 0 | 7 | 8 | 9 | 4,7,3,0,8,9 |
| 10-14 | 2 | 1 | 6 | 2 | 5 | 8 | 9 | 6,2,1,5,8,9 |
| 15-19 | 3 | 3 | 4 | 2 | 5 | 8 | 9 | 2,3,5,4,8,9 |
| 20-24 | 4 | 3 | 6 | 2 | 7 | 8 | 9 | 3,6,2,7,8,9 |
| 25-29 | 5 | 0 | 5 | 2 | 7 | 8 | 9 | 7,5,0,2,8,9 |
| 30-34 | 6 | 3 | 6 | 1 | 4 | 8 | 9 | 1,4,6,3,8,9 |
| 35-39 | 7 | 0 | 5 | 1 | 4 | 8 | 9 | 5,0,4,1,8,9 |
| 40-44 | 8 | 0 | 2 | 4 | 6 | 8 | 9 | 2,0,6,4,8,9 |
| 45-49 | 9 | 5 | 7 | 4 | 6 | 8 | 9 | 4,6,5,7,8,9 |

INVENTOR
W. O. FLECKENSTEIN
BY Harold C. Herman
ATTORNEY

Dec. 8, 1959 W. O. FLECKENSTEIN 2,916,557

UNIVERSAL LINE CONCENTRATOR

Filed May 21, 1957 14 Sheets-Sheet 14

FIG. 16

| | 12VG0 | 12VG1 | 12VG2 | 12VG3 | 12VG4 | 12VG5 | 12VG6 | 12VG7 | 12VG8 | 12VG9 | 12CN0-19 |
|---|---|---|---|---|---|---|---|---|---|---|---|
| 12TC(0) | 0 | 4 | 6 | 2 | 3 | 7 | 1 | 5 | 2 | 4 | – |
| 12TC(1) | 1 | 7 | 2 | 3 | 6 | 5 | 4 | 0 | 0 | 6 | – |
| 12TC(2) | 7 | 3 | 1 | 5 | 2 | 0 | 6 | 4 | 6 | 5 | – |
| 12TC(3) | 6 | 0 | 5 | 4 | 7 | 2 | 3 | 1 | 4 | 7 | – |
| 12TC(4) | – | – | – | – | – | – | – | – | – | – | 8 |
| 12TC(5) | – | – | – | – | – | – | – | – | – | – | 9 |
| 12TS0(5) | 8 | 12 | 14 | 10 | 11 | 15 | 9 | 13 | 10 | 12 | – |
| 12TS1(5) | 9 | 15 | 10 | 11 | 14 | 13 | 12 | 8 | 8 | 14 | – |
| 12TS2(5) | 15 | 11 | 9 | 13 | 10 | 8 | 14 | 12 | 14 | 13 | – |
| 12TS3(5) | 14 | 8 | 13 | 12 | 15 | 10 | 11 | 9 | 12 | 15 | – |
| 12TS4(5) | – | – | – | – | – | – | – | – | – | – | 18 |
| 12TS5(5) | – | – | – | – | – | – | – | – | – | – | 19 |
| 12TS0(4) | 16 | 20 | 22 | 18 | 19 | 23 | 17 | 21 | 18 | 20 | – |
| 12TS1(4) | 17 | 23 | 18 | 19 | 22 | 21 | 20 | 16 | 16 | 22 | – |
| 12TS2(4) | 23 | 19 | 17 | 21 | 18 | 16 | 22 | 20 | 22 | 21 | – |
| 12TS3(4) | 22 | 16 | 21 | 20 | 23 | 18 | 19 | 17 | 20 | 23 | – |
| 12TS4(4) | – | – | – | – | – | – | – | – | – | – | 28 |
| 12TS5(4) | – | – | – | – | – | – | – | – | – | – | 29 |

FIG. 17

| | 2VG0-9 |
|---|---|
| 12CN0-19(10) | 8 |
| 12CN0-19(11) | 9 |
| 12CN0-19(12) | 10 |
| 12CN0-19(13) | 11 |
| 12CN0-19(14) | 12 |
| 12CN0-19(15) | 13 |
| 12CN0-19(16) | 14 |
| 12CN0-19(17) | 15 |
| 12CN0-19(20) | 16 |
| 12CN0-19(21) | 17 |
| 12CN0-19(22) | 18 |
| 12CN0-19(23) | 19 |
| 12CN0-19(24) | 20 |
| 12CN0-19(25) | 21 |
| 12CN0-19(26) | 22 |
| 12CN0-19(27) | 23 |

INVENTOR
W. O. FLECKENSTEIN
BY
Harold C. Herman
ATTORNEY

United States Patent Office 2,916,557

Patented Dec. 8, 1959

2,916,557

UNIVERSAL LINE CONCENTRATOR

William O. Fleckenstein, Whippany, N.J., assignor to Bell Telephone Laboratories, Incorporated, New York, N.Y., a corporation of New York Application May 21, 1957, Serial No. 660,657

16 Claims. (Cl. 179—18)

This invention relates to line concentrator systems and more particularly to line concentrator systems which may be utilized in any of the conventional telephone systems.

In conventional telephone systems each substation normally requires a pair of wires to connect it with the central office. These wires or lines are the most inefficiently utilized portions of the telephone system because on the average they are utilized infrequently compared to the usage of the common equipment in the central office. Moreover, for a substation which is located at a considerable distance from the central office the cost of these wires is substantial. In fact, in the present day telephone plant a large portion of the cost of installation and operation relates to the wires used in the subscriber loops between the substations and the central office. The utilization of a line concentrator system becomes attractive where the outside plant costs are high and the distances between groups and substations and the central office are large while the number of substations and the amount of local interconnecting traffic among the substations are not adequate to justify their connection to a separate central office. Line concentrator systems are also utilized when cable is unavailable, or to give temporary service.

It is a general object of this invention to improve the efficiency of utilizing subscriber lines by connecting them through a line concentrator to the central office.

Another object of this invention is to provide a line concentrator system which may be utilized with any of the conventional telephone systems.

Still another object of this invention is to provide line concentrator facilities which do not decrease the quality of telephone service.

Another object of this invention is to establish connections between the subscriber lines and their associated line terminations in the central office without changing the potential conditions at the line terminations except for the usual closure change indicating a service request or off-hook condition.

Still another object of this invention is to avoid the necessity of outpulsing the line identity to the remotely located line concentrator.

In an illustrative embodiment of this invention, the line concentrator system includes concentrator and expander pairs. The concentrators are remotely located and the expanders are located at the central office. Each concentrator functions to establish connections between a number of subscriber lines and a smaller number of concentrator trunks which extend from the associated expander at the central office. Each expander functions to establish connections between a number of line terminations, which are individually associated with the subscriber lines, and the concentrator trunks. Each concentrator and expander pair is operated to establish a connection from any one of the subscriber lines through a selected concentrator trunk to the associated central office line termination.

A feature of this invention relates to means for operating the concentrator together with the expander to establish a line-to-line termination connection whenever a call from or to any one of the lines is initiated.

At the central office, the line terminations are handled by the conventional telephone system as ordinary lines. The line concentrator system may be utilized with any of the conventional telephone systems. For example, it may be utilized with the crossbar telephone system of the type described in the Patent 2,585,904 granted to A. J. Busch on February 19, 1952.

Another feature of this invention relates to means for cyclically and synchronously scanning both the subscriber lines and their associated line terminations at the central office. The scanning means functions to determine the service conditions of both lines and line terminations. By scanning the line terminations as well as the subscriber lines, the necessity of outpulsing the line identity to the line concentrator is avoided because both the line concentrator and the central office automatically register the line identity when a call is initiated to or from a subscriber line.

When a call is initiated to or from a subscriber line, the service request is detected and the identity of the line is registered at the central office. With the line identity registered at the central office, an idle concentrator trunk is selected for the connection. The concentrator and expander function to connect the selected trunk between the associated line and line termination. The time required for establishing the connection is small compared to the usual dial-tone delays and ring-tone intervals so that the quality of telephone service is not reduced. The connection is established at the concentrator by supplying to the concentrator mark pulses over the control path, and a connect potential over the selected trunk. Concurrent with the establishment of a connection at the concentrator, a connection is established from the line termination to the central office end of the trunk. At the central office the concentrator trunk remains open at a trunk control circuit which connects the trunk to the line expander. The trunk control circuit completes the talking connection from line-to-line termination after the connect potential has been removed from the selected trunk.

A further feature of this invention pertains to the removal of the trunk connect potential from the selected trunk before the talking connection is completed to avoid applying the connect potential to the line termination.

Still a further feature of this invention relates to common control means for operating a number of concentrator expander pairs in synchronism. When a call is being served by any of the concentrator-expander pairs the common scanning system is halted.

Further objects and features will become apparent upon consideration of the following description in conjunction with the drawing wherein.

Figures 1, 2:
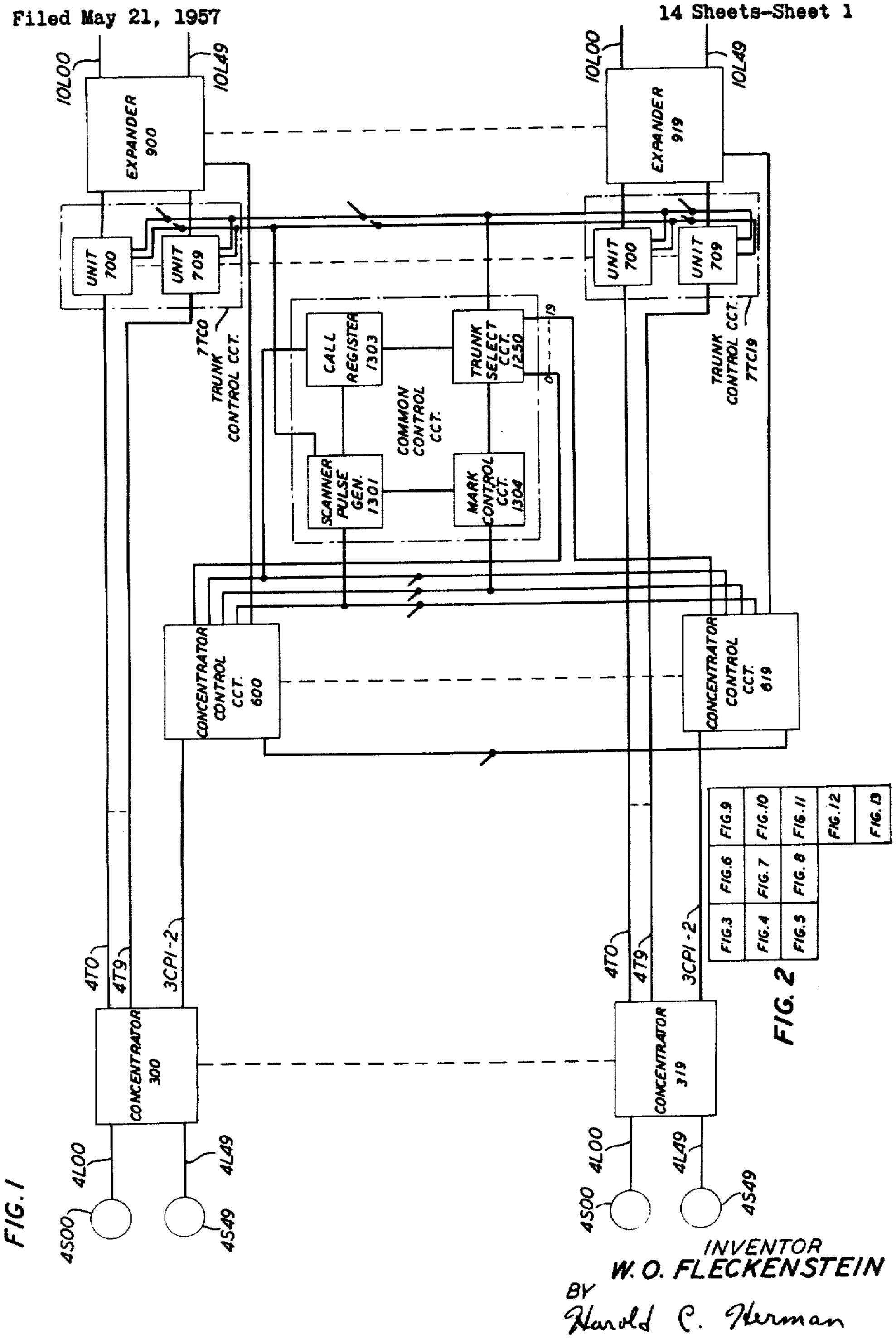
Fig. 1 is a functional or box diagram representation of the concentrator system of the present invention.
Fig. 2 illustrates the arrangement of Figs. 3 through 13.
Figure 3:
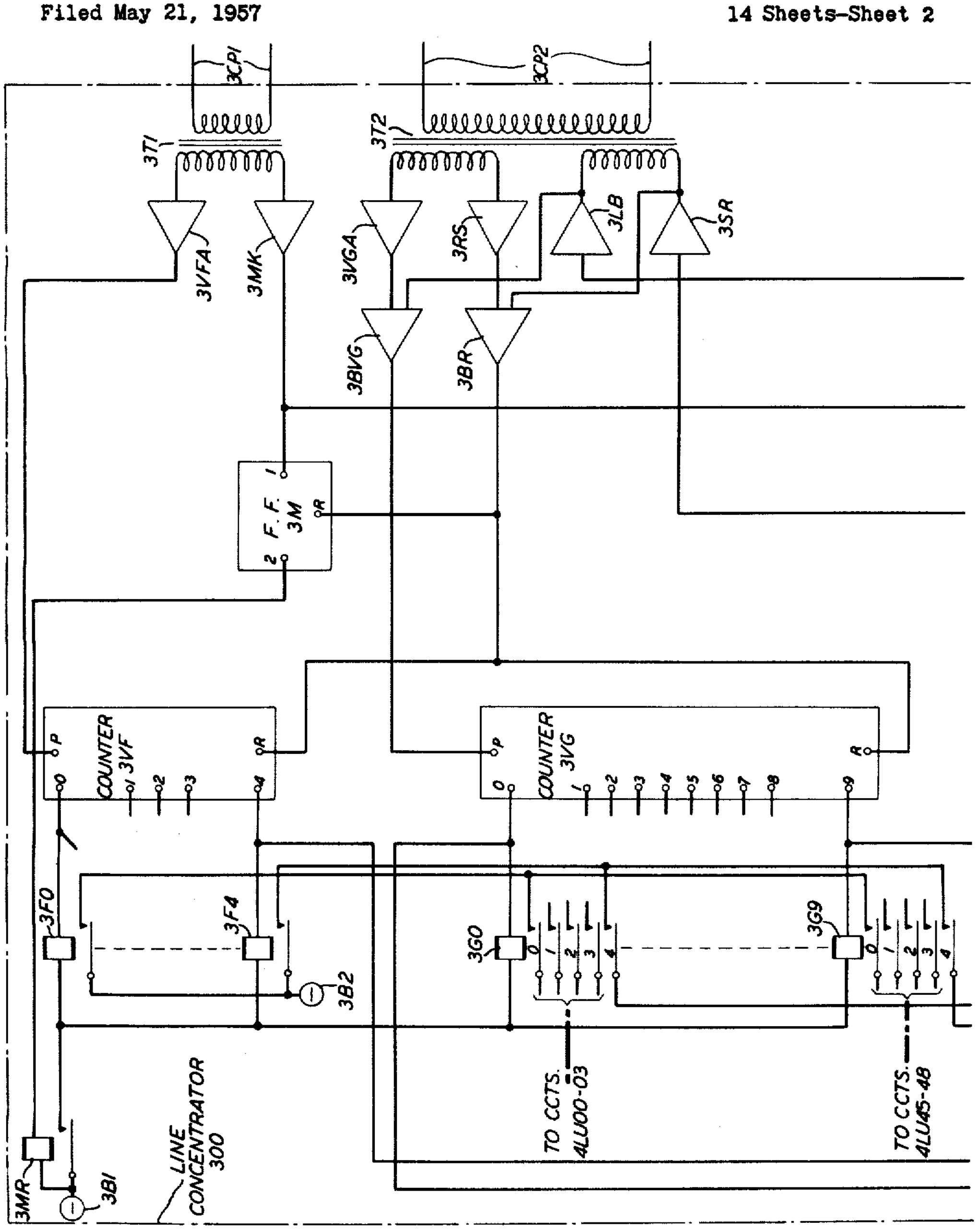
Figure 4:
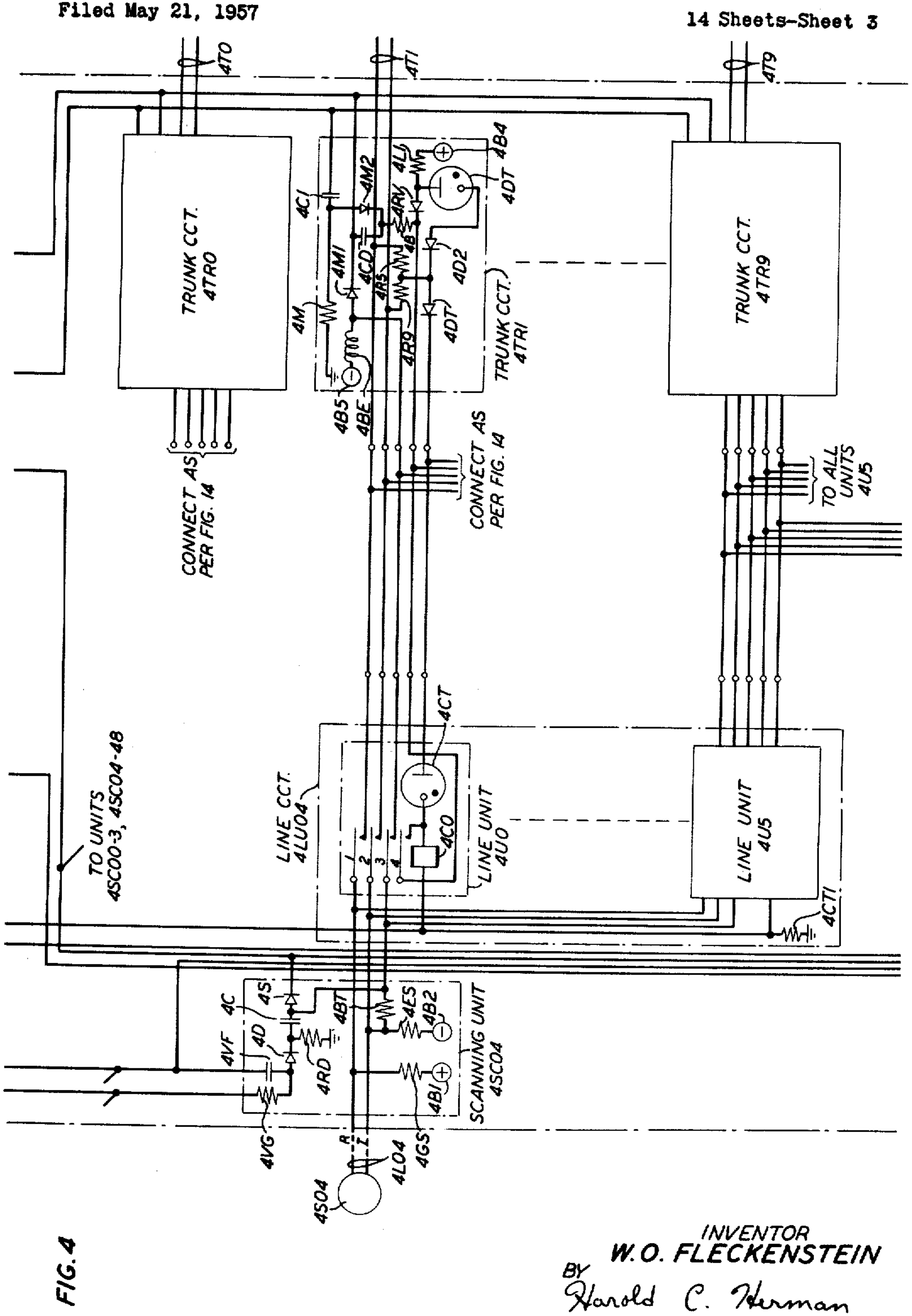
Figure 5:
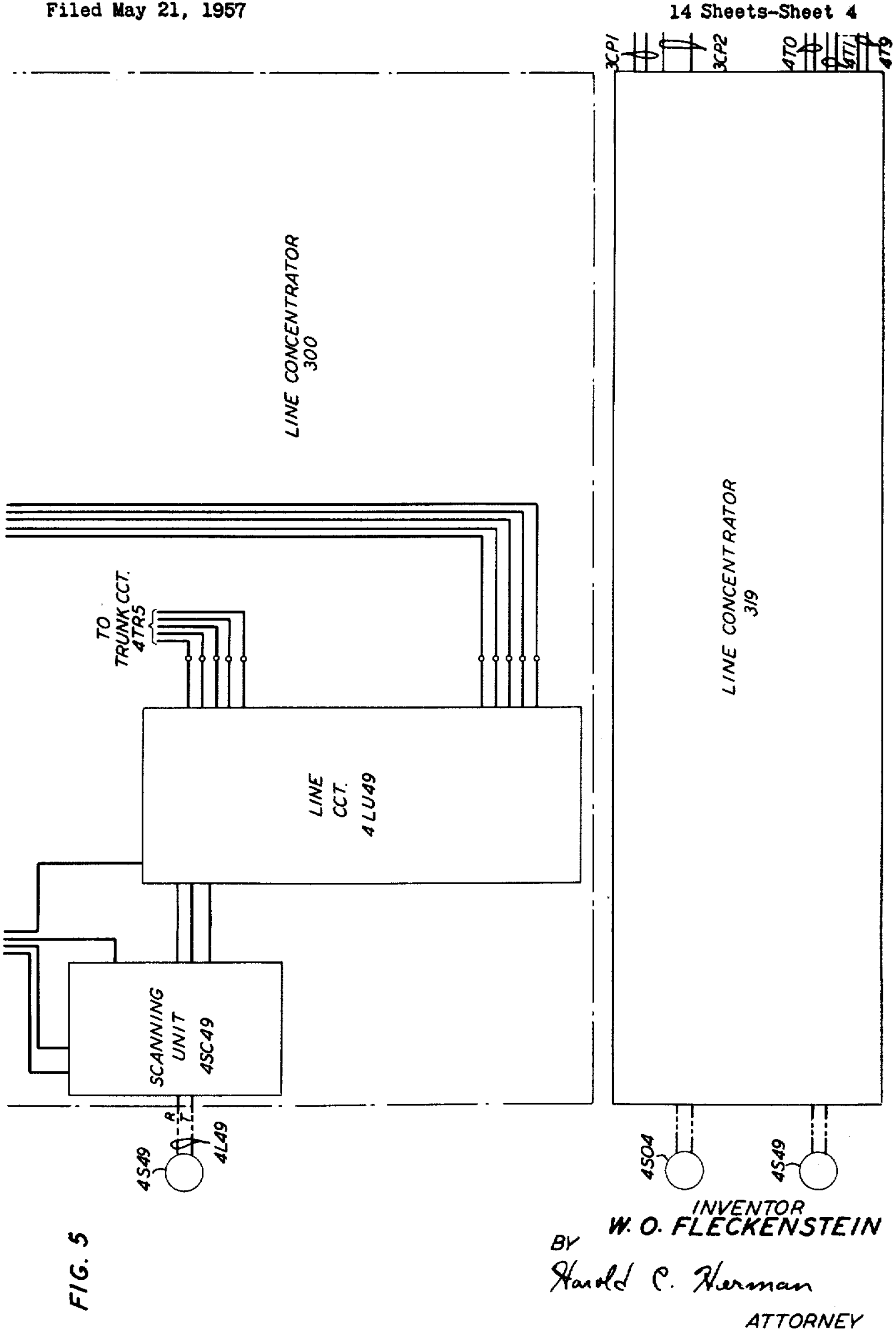
Figure 6:
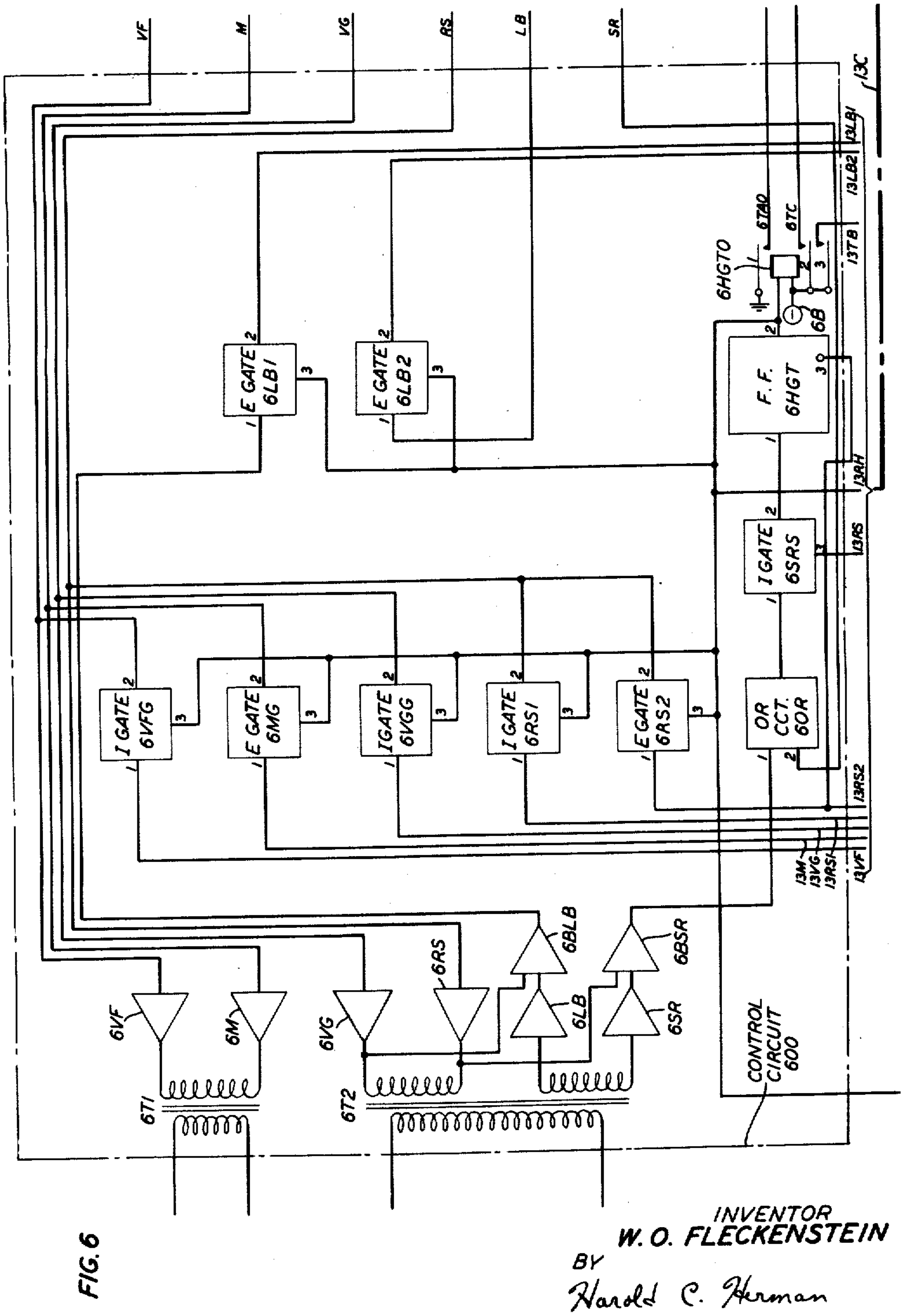
Figure 7:
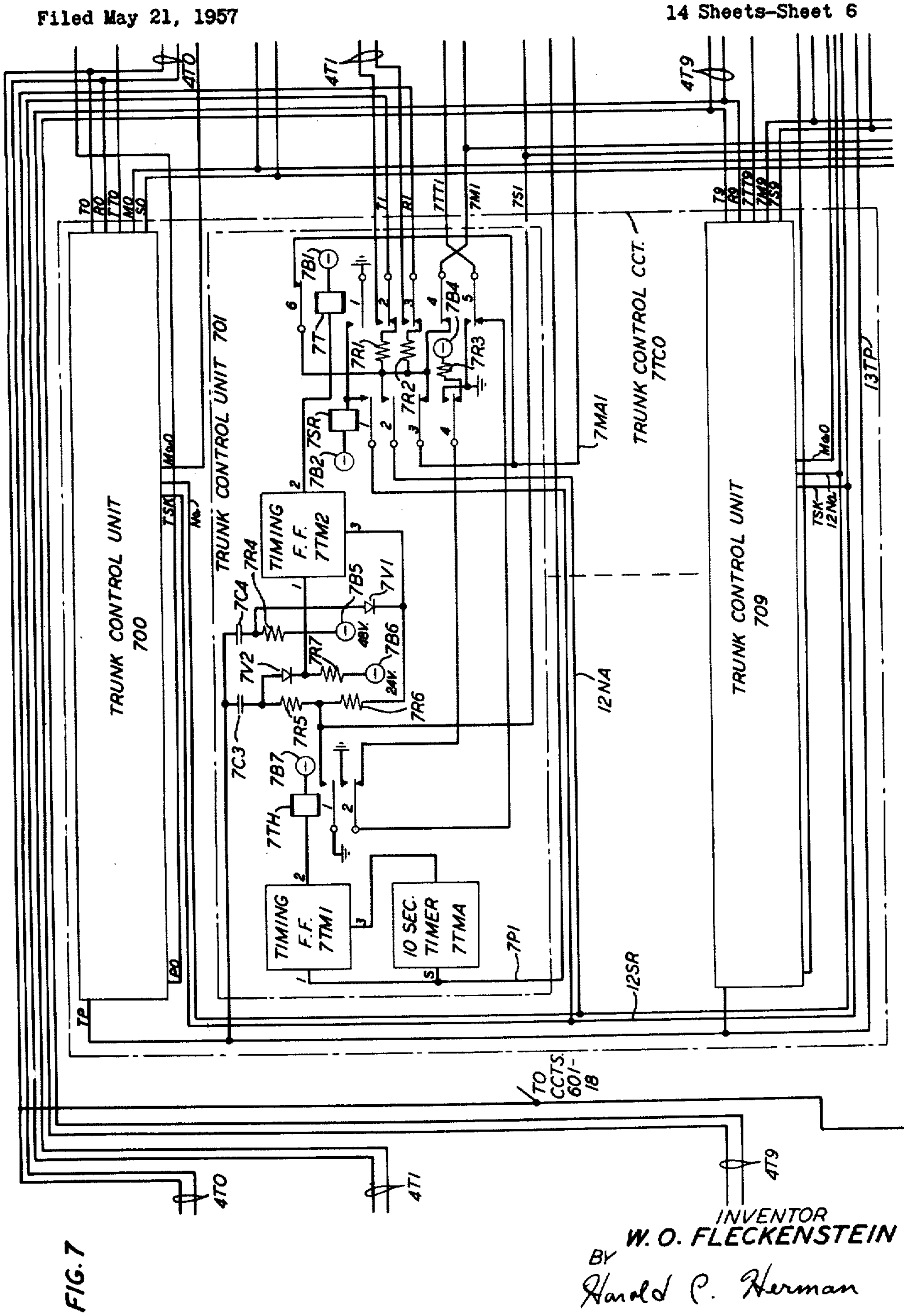
Figure 8:
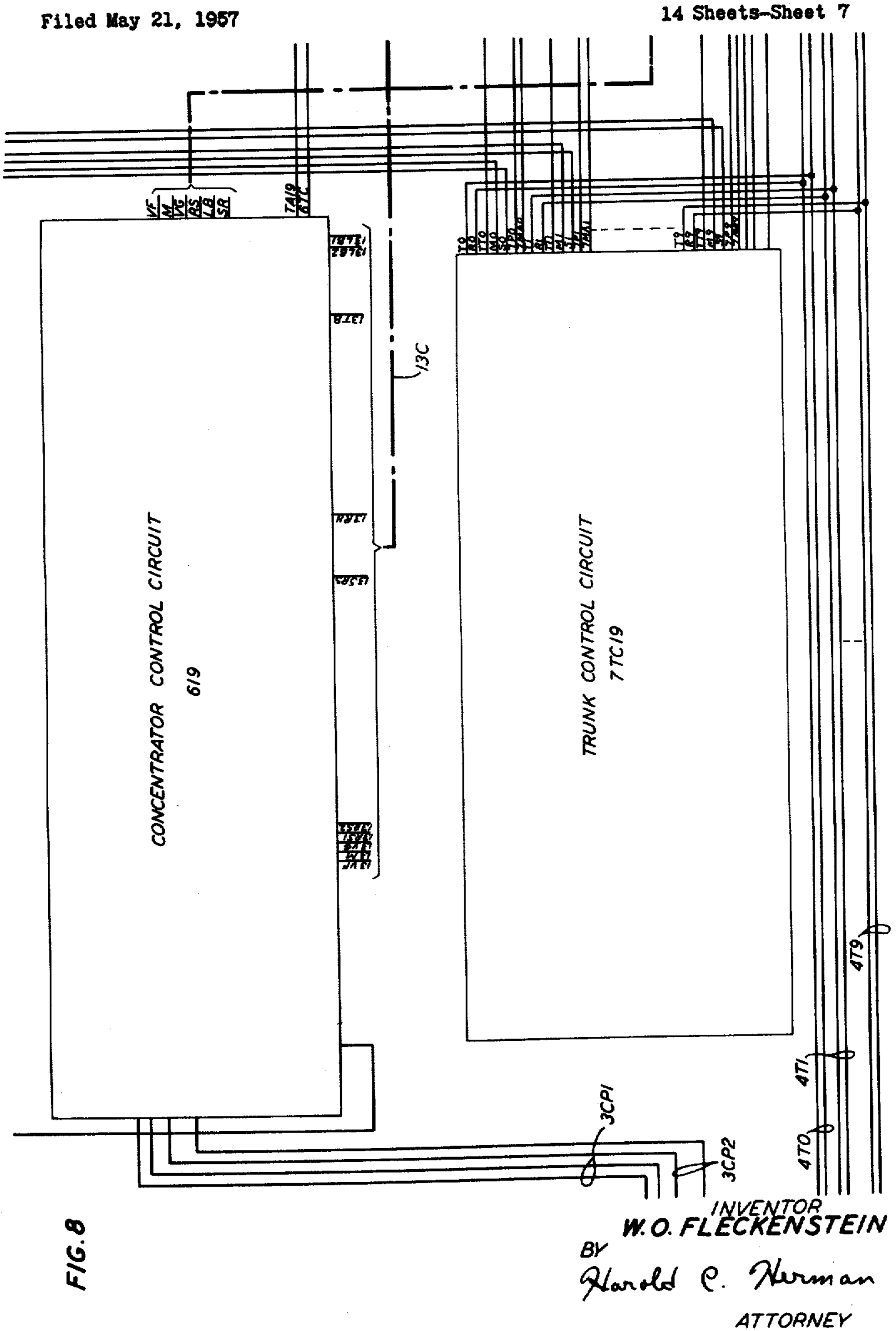
Figure 9:
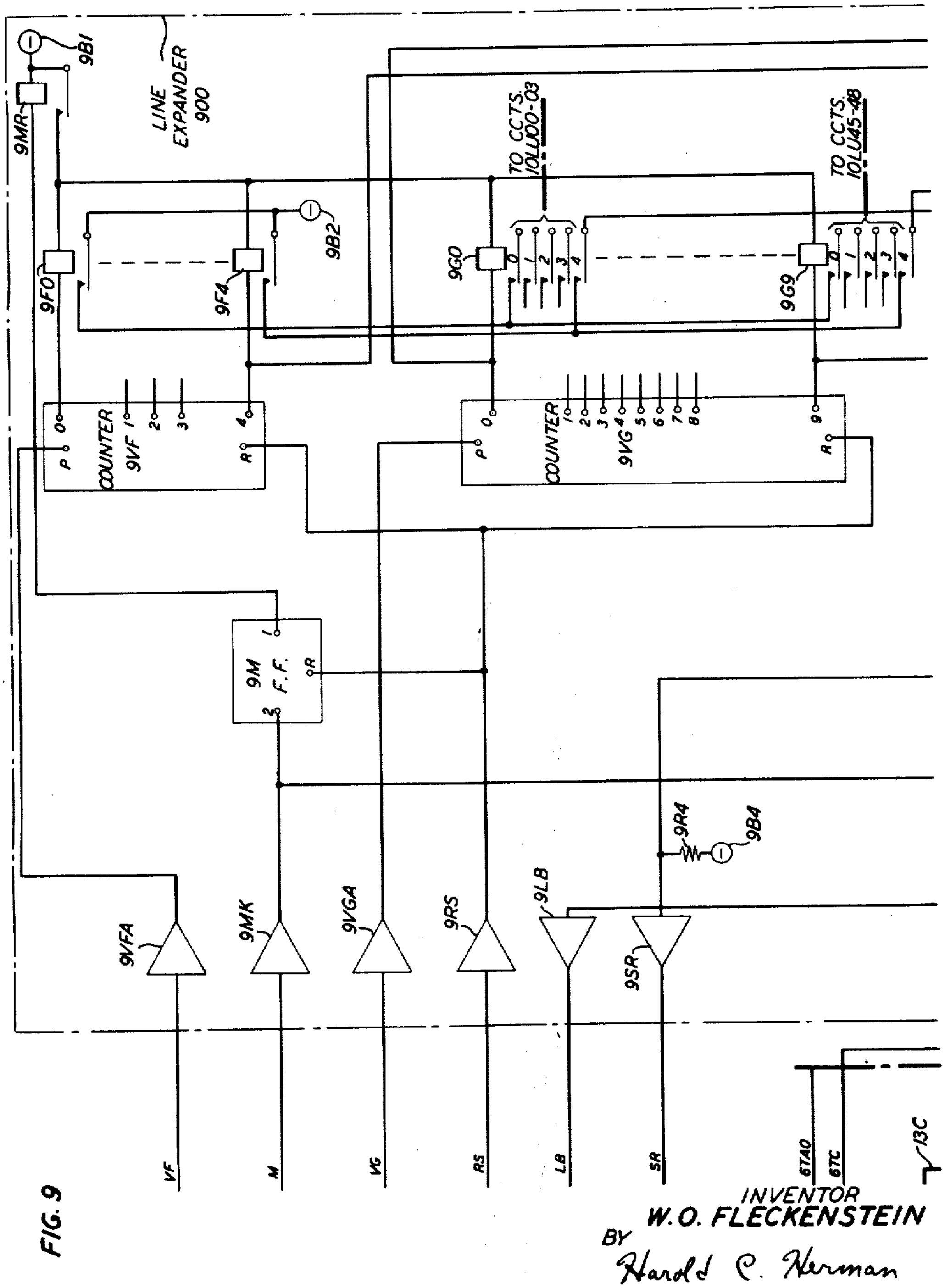
Figure 10:
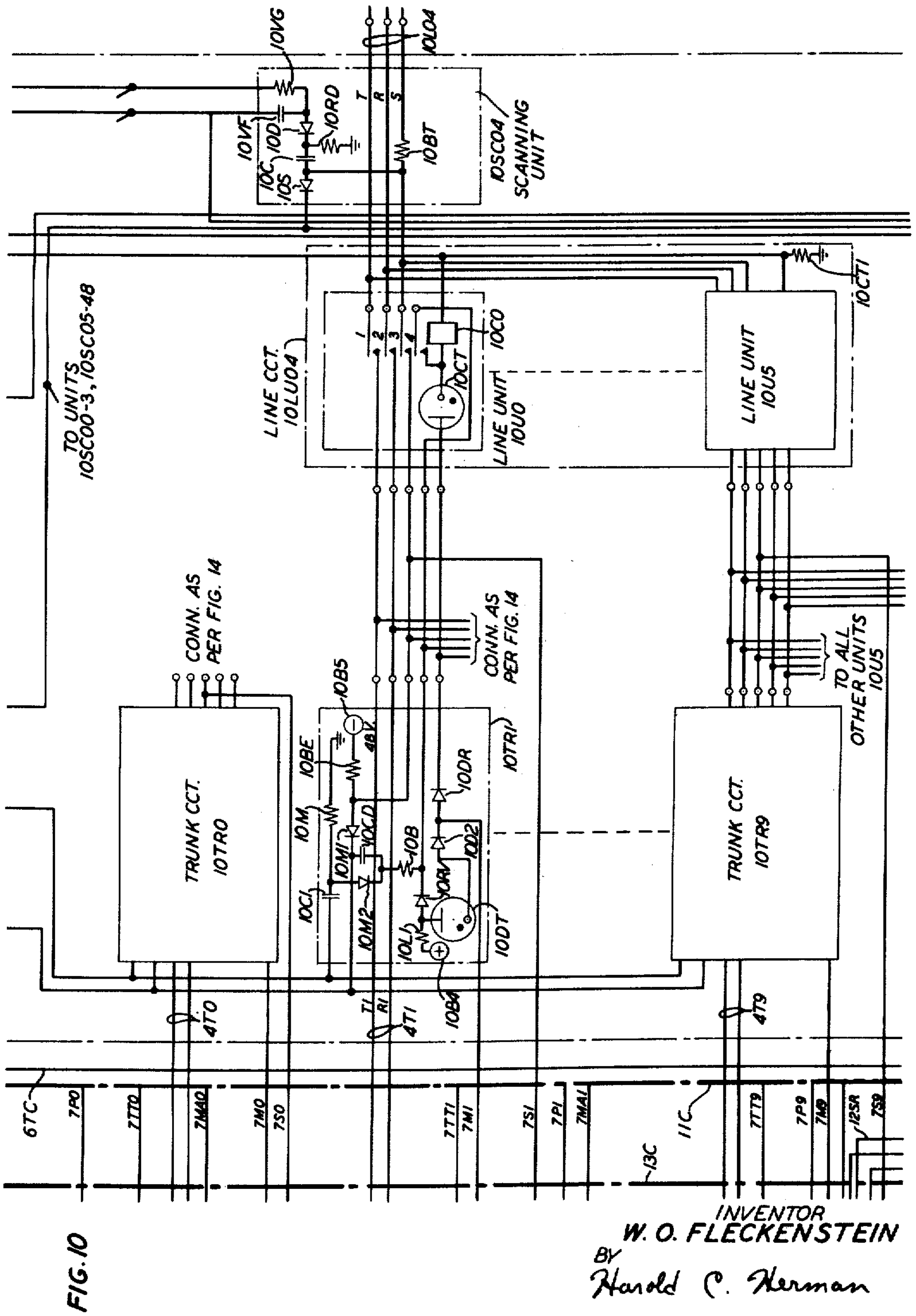
Figure 11:
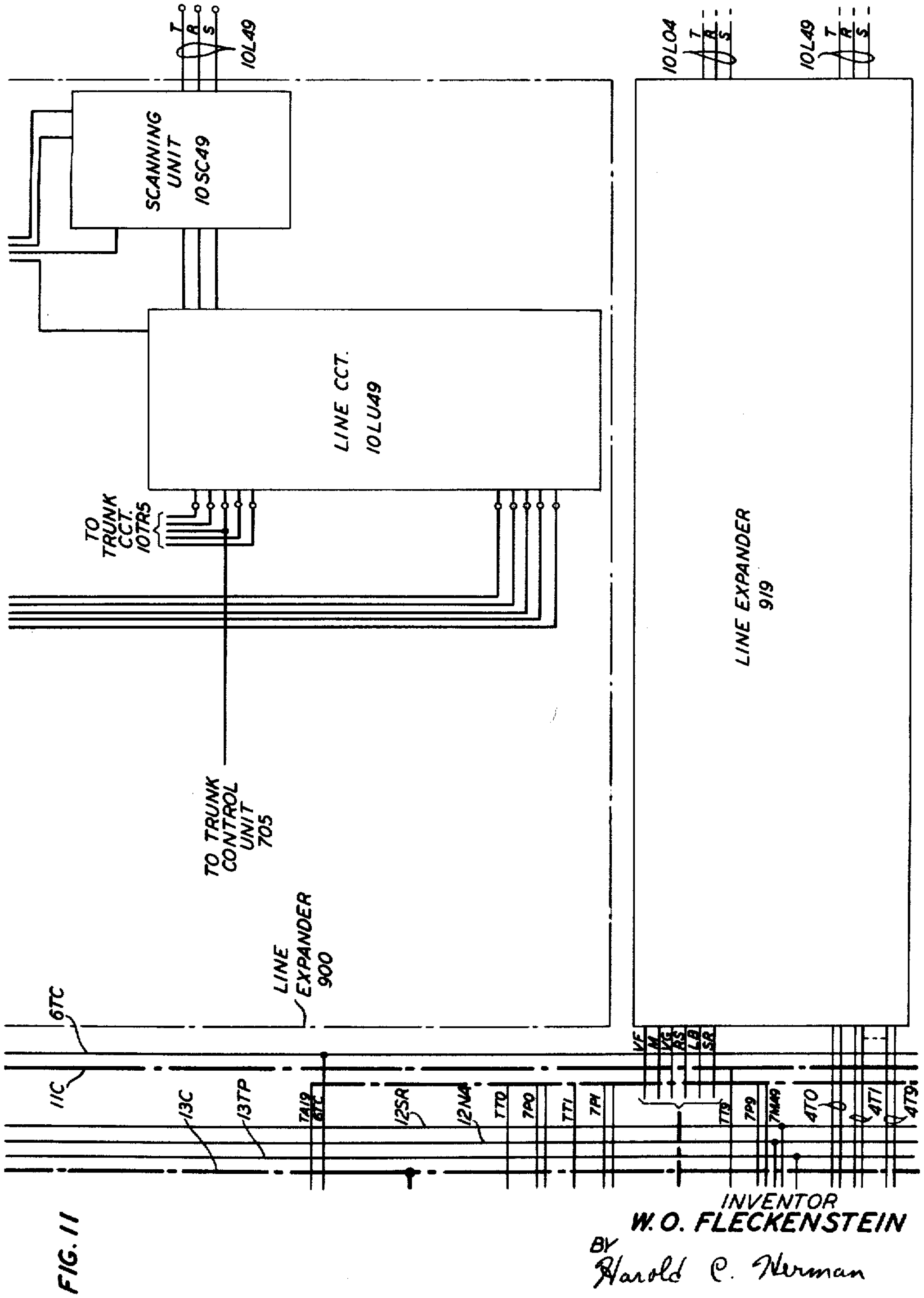
Figure 12:
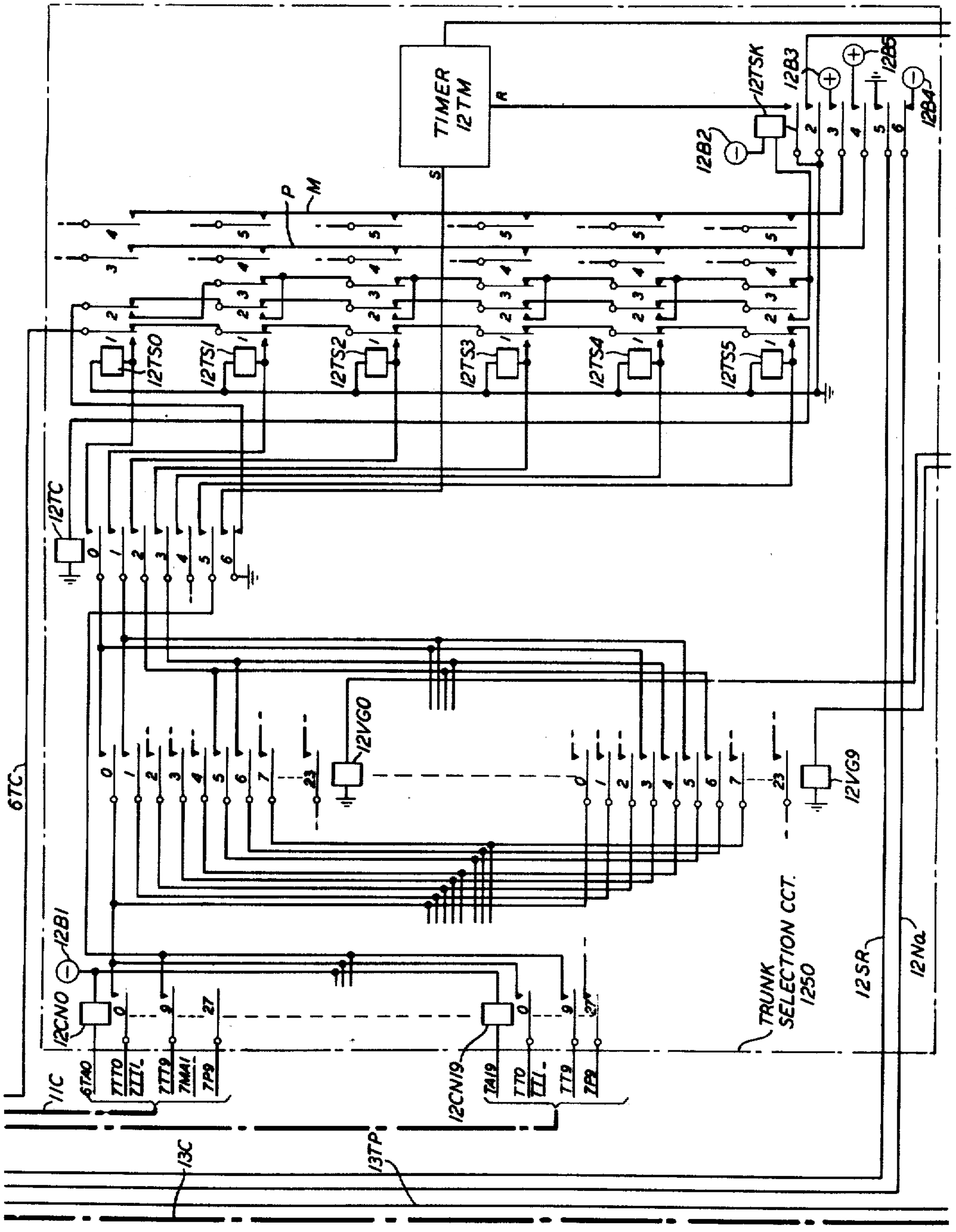
Figure 13:
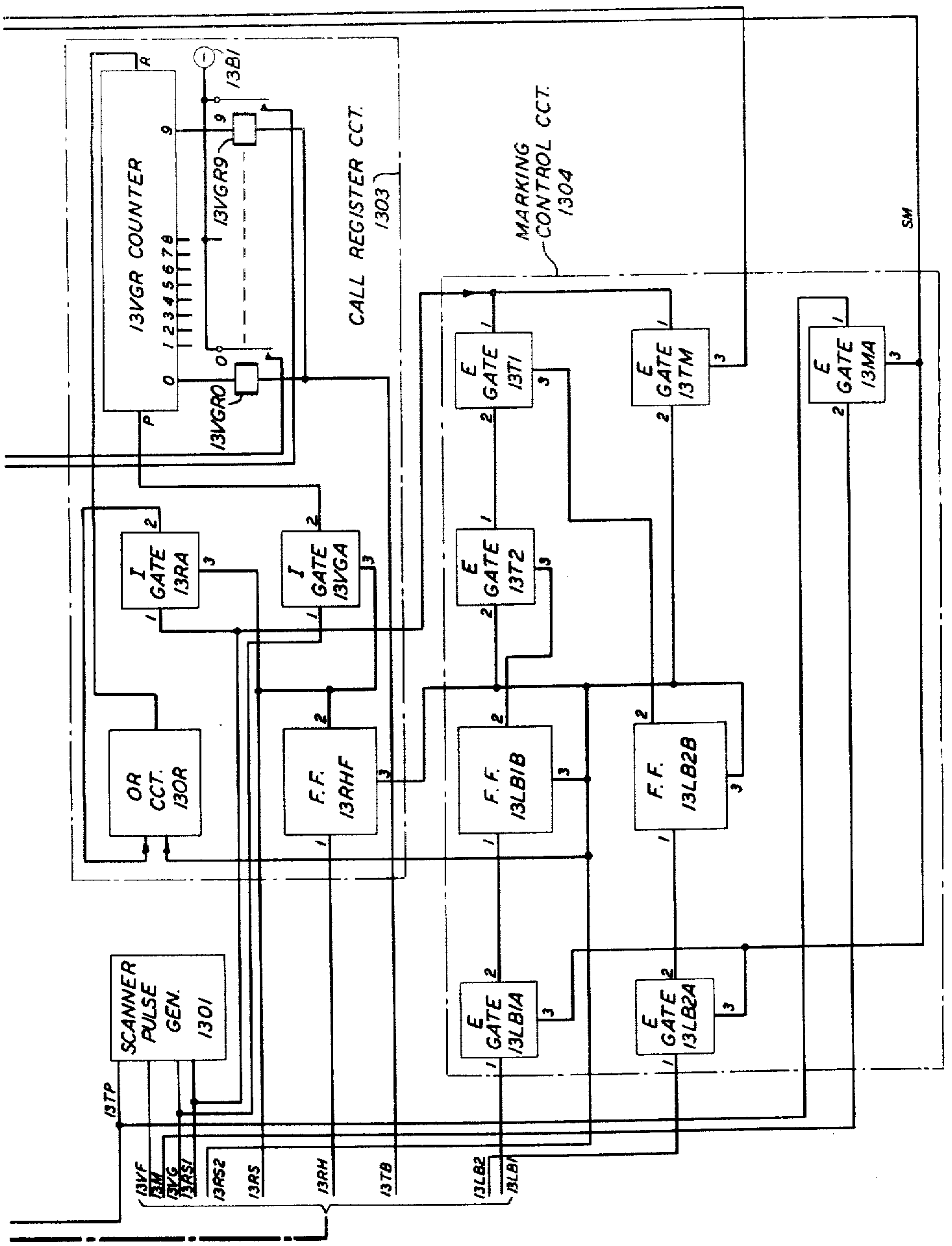
Figures 14, 15:
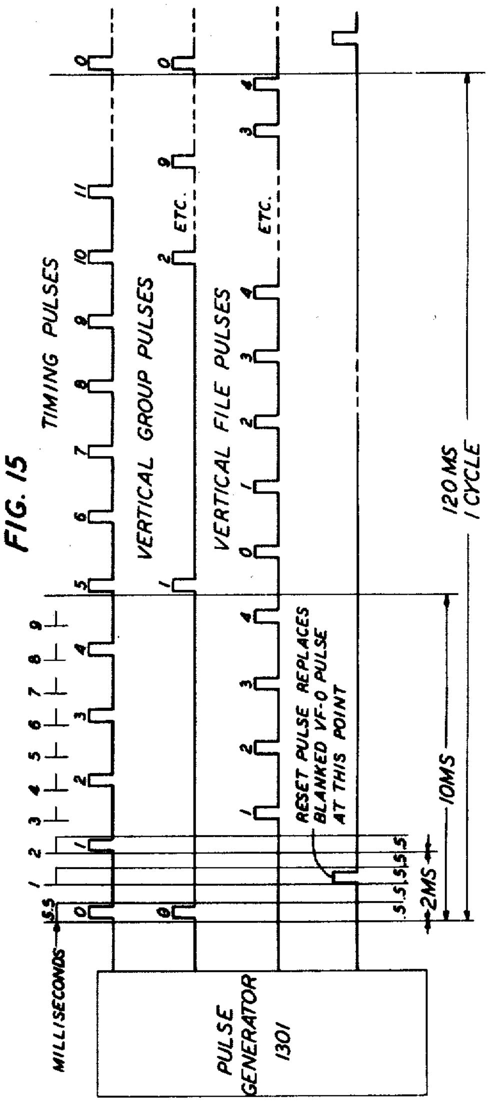

Figs. 3 through 13, when arranged in accordance with Fig. 2, are a detail circuit representation of the concentrator system of this invention wherein;

Figs. 3, 4 and 5 are a circuit representation of a line concentrator unit;

Fig. 6 is a circuit representation of a concentrator control circuit;

Fig. 7 is a circuit representation of a trunk control unit;

Fig. 8 is a functional representation of a concentrator control circuit and a trunk control circuit;

Figs. 9, 10 and 11 are a circuit representation of an expander;

Fig. 12 is a circuit representation of the trunk selection circuit;

Fig. 13 is a circuit representation of the mark control circuit, pulse generator and register;

Fig. 14 is a table illustrating the trunk connections and the trunk preference;

Fig. 15 is a series of curves illustrating the scanning sequence; and

Figs. 16 and 17 are tables illustrating the connections to the armatures of the vertical group relays.

*General description*

Referring to Fig. 1, which is a functional or a box diagram of the universal line concentrator system of this invention, the reference numbers generally indicate the figure in the detail circuit representation in which the component appears. For example, the concentrator 300 is shown partially in Fig. 3.

The line concentrator 300 is one of twenty line concentrators 300–19 which function to establish connections from the twenty sets of substations 4S00–49. The concentrators 300–19 and their associated substations 4S00–49 are remotely located and all the rest of the equipment shown in Fig. 1 is located at the central office. The substations 4S00–49 are connected, respectively, by the lines 4L00–49 to the associated one of the concentrators 300–19. Each of the concentrators 300–19 is connected by means of ten trunks 4T0–9 and two control pairs 3CP1–2 to the central office. Each set of trunks 4T0–9 provides talking paths between the associated one of the line concentrators 300–19 and the central office and each set of control pairs 3CP1–2 provides signaling paths to and from the central office. The effect of utilizing the line concentrators 300–19 is to place a part of the central office switching equipment at a remote location in order to more efficiently utilize the connections extending from the central office.

With fifty subscriber lines 4L00–49 connected to each of the twenty line concentrators 300–19, there are a total of 1000 subscriber lines which are served by the central office equipment.

In the central office the twenty sets of ten trunks 4T0–9 are connected, respectively, through twenty individually associated trunk control circuits 7TC0–19 to twenty line expanders 900–19. Each of the line expanders 900–19 functions to establish connections between its associated set of ten trunks 4T0–9 and fifty line terminations 10L00–49. The line terminations 10L00–49 are associated individually with the subscriber lines 4L00–49 which are connected to the associated one of the line concentrators 300–19. Each concentrator-expander pair, such as concentrator 300 and expander 900, functions to establish connections from the subscriber lines 4L00–49 connected to the concentrator, through the ten trunks 4T0–9 interconnecting the concentrator and the expander to the line terminals or terminations 10L00–49 connected to the line expander. For example, the line terminal 10L04, which is connected to the line expander 900, is associated with the subscriber line 4L04 which is connected to the concentrator 300. As hereinafter described, when a call is initiated to or from the subscriber line 4L04 of concentrator 300, the line concentrator system functions to establish a connection from the line 4L04 of concentrator 300 to the line terminal 10L04 of expander 900.

The twenty sets of line terminals 10L00–49 appear to a telephone system, not shown, just as if they were ordinary subscriber lines terminating thereat. In other words, as far as the telephone system is concerned, the line terminals 10L0–49 are the subscriber lines. The telephone system to which the line terminals 10L0–49 are connected is not shown though the concentrator system of the present invention may be utilized with any of the conventional types of telephone systems.

With all twenty sets of subscriber lines 4L00–49 and all twenty sets of line terminations 10L00–49 idle, the central office continuously and synchronously scans the lines 4L00–49 and the terminals 10L00–49. All twenty lines and all twenty line terminals having a similar designation are scanned at the same time. For example, all twenty lines 4L04 which are connected individually to the twenty concentrators 300–19 and all twenty line terminals 10L04 which are connected individually to the twenty line expanders 900–19 are scanned simultaneously.

The twenty line concentrators 300–19 and the twenty line expanders 900–19 are driven by a scanner pulse generator 1301 which is described in detail in the Joel-Krom-Posin Patent 2,812,385 which issued November 5, 1957. The scanner pulse generator 1301 simultaneously provides scanning pulses in parallel through twenty control circuits 600–19 and the twenty sets of control pairs 3CP1–2 to the concentrators 300–19. The scanning pulse generator 1301 also supplies the scanning pulses in parallel through the twenty control circuits 600–19 to the twenty expanders 900–19. The control circuits 600–19 are in this manner individually associated with the concentrator-expander pairs and the generator 1301 is common to all concentrator-expander pairs.

The scanner pulse generator 1301 also supplies some of the scanning pulses to a call register circuit 1303, to the marking control circuit 1304 and to the twenty trunk control circuits 7TC0–19. The function of the scanning pulses at the circuit 1304 and at the circuits 7TC0–19 is hereinafter described. The register 1303 is synchronously and cyclically operated under control of the scanning pulses from the generator 1301 together with the twenty line concentrators 300–19 and the twenty line expanders 900–19.

As shown in Fig. 15 the scanner pulse generator 1301 supplies four types of pulses: vertical group pulses; vertical file pulses, reset pulses and timing pulses. The vertical file, vertical group and reset pulses are supplied to each of the concentrators 300–19 and to each of the expanders 900–19 but only the vertical group and reset pulses are provided to the register 1303. The timing pulses which are utilized when a terminating or originating call is being served are supplied to the circuit 1304 and to the circuits 7TC0–19. The vertical group pulses function to identify a group of subscriber lines and their associated line terminations and the vertical file pulses function to identify the lines and terminations in the group. As in ordinary crossbar telephone systems the subscriber lines are arbitrarily arranged in vertical groups, vertical files and horizontal groups. Such crossbar telephone systems are described for example in the above-identified Busch patent. The subscriber lines 4L00–49 connected to each of the twenty line concentrators 300–19 are subdivided into ten vertical groups each of which includes five vertical files. Each of the vertical group pulses supplied from the scanner pulse generator 1301 selects a group of five lines and their five associated line terminals connected respectively to each of the line concentrators 300–19 and line expanders 900–19. Since each vertical group pulse is supplied in parallel to the twenty line concentrators 300–19 and to the twenty line expanders 900–19 it functions to select five times twenty or 100 subscriber lines and their 100 associated line terminals. Between two such vertical group pulses the scanner pulse generator 1301 supplies five vertical file pulses to the concentrators 300–19 and to the expanders 900–19. One subscriber line connected to each of the concentrators 300–19 or twenty in all and their associated line terminals are scanned by each vertical file pulse. In order to scan the 1000 lines, the scanner pulse generator 1301 provides, to each of the twenty line concentrators 300–19 and to each of the twenty line expanders 900–19, ten 15-volt vertical group pulses spaced at intervals of 10 milliseconds and five 15-volt vertical file pulses spaced at intervals of 2 milliseconds between each pair of vertical file pulses. The vertical file and vertical group pulses are ½ millisecond pulses and the complete scanning cycle has a duration of 100 milliseconds.

In addition to the vertical group and vertical file pulses the generator 1301 supplies one reset pulse at the beginning of each cycle to insure the synchronous operation of the line concentrators 300–19, the line expanders 900–19 and the call register 1303 with that of the generator 1301. The reset pulse also functions as the first vertical file pulse so that only forty-nine vertical file pulses are provided instead of fifty during each cycle.

To recapitulate, during each scanning cycle the pulse generator 1301 supplies one reset pulse, ten vertical group pulses and forty-nine vertical file pulses. One vertical file pulse is provided if the reset pulse is counted as a vertical file pulse for each of the fifty subscriber lines 4L00–49. In addition to the vertical group, vertical file and reset pulses the scanner pulse generator 1301 also supplies fifty timing pulses during each scanning cycle. As is hereinafter described, the timing pulses are utilized when a call is initiated to or from any of the 1000 subscriber lines in the system.

When any one of the subscriber lines 4L00–49 is closed to initate a service request its associated concentrator 300 supplies a service request pulse in the time slot during which the line is scanned to the associated concentrator control circuit in the central office. For example, if line 4L04 of concentrator 300 initiates a service request, a service request pulse is provided through the control pairs 3CP1–2 during the time slot that the line 4L04 is scanned to the control circuit 600. A service request pulse may be received at the concentrator control circuit 600 also from the expander 900. For example, if the line terminal 10L04 of expander 900 is placed in a calling condition by the telephone system, not shown, the expander 900 provides a service request to the circuit 600 during the time slot during which the terminal 10L04 was scanned. As described above, the line 4L04 and the terminal 10L04 are scanned during the same time slot. In this manner a service request can be received at the concentrator control circuit 600 from either the line concentrator 300 or the line expander 900. Either service request initiates a similar sequence of operations in the central office for selecting an idle one of the trunks 4T0–9 which connected the concentrator 300 to the expander 900.

When a service request pulse is received at one of the control circuits 600–19, it interrupts the scanning sequence of operation to stop the asociated concentrator-expander pair and also the call register circuit 1303 at the identity of the calling line or line termination. The service request also initiates the operation of the trunk selection circuit 1250 and the mark control circuit 1304. If a call is initiated on line 4L04 connected to the concentrator 300 the call register circuit 1303, which registers only vertical group identities, is stopped at the vertical group 0. The control circuit 600 also provides an indication of the identity of the concentrator-expander pair from which the call originated to the trunk selection circuit 1250. When the marking control circuit 1304 is operated, it disables all twenty of the control circuits 600–19 so that subsequent service requests are inhibited. When the call register circuit 1303 is stopped at the vertical group identity of the calling line 4L04, it supplies an indication of the vertical group identity to the trunk selection circuit 1250. In this manner the trunk selection circuit 1250 receives the concentrator identity from the circuit 600 and the vertical group identity of the calling line from the circuit 1303.

When the trunk selection circuit 1250 receives this information, it initiates a trunk selection sequence of operation for selecting one of the ten trunks 4T0–9 which interconnect the line concentrator 300 through the trunk control circuit 7TC0 to the line expander 900. The trunk control circuit 7TC0, which is individually associated with the line concentrator 300 and the line expander 900, functions to control the establishment of the talking connection between the calling line 4L04 and its associated line termination 10L04. In fact, as is hereinafter described, the talking connection between the line 4L04 and the line termination 10L04 is completed in the circuit 7TC0 after the establishment of connections in the line concentrator 300 and the line expander 900 to the ends of the selected trunk.

In the trunk selection circuit 1250 the vertical group identity determines which six of the ten trunks 4T0–9 are to be considered for selecting the trunk for the talking connection between the line 4L04 and the termination 10L04. The lines 4L00–49 are each connectable to the central office by only six of the ten trunks 4T0–9. The six trunks, which are connectable to any one of the lines 4L00–49, are referred to as being in the same trunk multiple. At the line expander 900 the line termination 10L04 is connectable to the same six trunks which are in the trunk multiple connectable to the line 4L04. The trunks connectable to each of the fifty lines 4L00–49 and fifty line terminations 10L00–49 are tabulated in Fig. 14. As indicated in Fig. 14, the five lines and five line terminations in the same vertical group have the same trunk multiple. For example, lines 4L00 and 4L04, which are in the vertical group 0, are connectable to the same six trunks. For the calling line 4L04 a connection may be established to any one of the trunks 4T0, 4T1, 4T6, 4T7, 4T8 and 4T9. A connection cannot be established from line 4L04 to any of the trunks 4T2, 4T3, 4T4 and 4T5.

The trunk selection circuit 1250 functions to select an idle preferred one of the six trunks connectable to the calling line 4L04. As indicated also in Fig. 14, the trunk preference for the line 4L04 is in the following order: 4T0, 4T1, 4T7, 4T6, 4T8 and 4T9. If trunk 4T0 is busy, being utilized for another connection, the second preferred trunk, which is trunk 4T1, is selected for the talking connection. The trunk control units 700–9 in the trunk control circuits 7TC0 supply the service conditions of the trunks 4T0–9 to the trunk selection circuit 1250. The service condition is determined by whether an operating potential is supplied to the trunk selection circuit 1250 or not. If trunk 4T0 is busy, an operating potential corresponding thereto is not supplied by the unit 700 to the trunk selection circuit 1250. The operating potential is provided, however, for the unit 701 associated with the trunk 4T1 which is idle.

When the circuit 1250 selects a trunk for the talking connection between the line 4L04 and the line termination 10L04, the connection is still open at three different places: it is open in the concentrator 300; in the expander 900; and in the unit 701 of the trunk control circuit 7TC0. As is hereinafter described, the connections are completed in the concentrator 300 and the expander 900 before the connection is completed in the unit 701.

When the trunk selection circuit 1250 selects the idle preferred trunk 4T1, it supplies a plus 100-volt connect potential through the unit 701 in circuit 7TC0 and the tip and ring leads of the trunk 4T1 to the concentrator 300, and through the unit 701 to the expander 900. The selection circuit 1250 also initiates the operation of the trunk control unit 701 to complete the talking connection. A delay is provided in the unit 701 so that the line concentrator 300 and line expander 900 complete their operations before the operation of the unit 701. In addition to the plus 100-volt connect potential, which is supplied to the line concentrator 300 and to the line expander 900 from the circuit 1250, marking pulses are supplied from the marking control circuit 1304 to the line expander 900 and over the control pairs 3CP1 to the concentrator 300. The marking control circuit 1304 supplies the mark pulses under control of the trunk selection circuit 1250. When the trunk selection circuit 1250 operates to select the trunk 4T1 and to supply the plus 100-volt connect potential, it also supplies a control potential to the marking control circuit 1304. The marking control circuit 1304 steers the timing pulses which it receives from the scanner pulse generator 1301 to the control circuit 600 and thence to the line concentrator 300 and to the line expander 900. As described above, when the scanning sequence of operation is halted due to the reception of the service request pulse at the circuit 600, the line concentrator 300 and the line expander 900 are stopped at the calling line identity. When the mark pulses are supplied to the concentrator 300 and to the expander 900, they initiate the operation thereat for establishing connections from the line 4L04 and from the line termination 10L04.

At the line concentrator 300 it is the combination of three factors which provides for the connection establishment: First, the concentrator 300 is stopped at the line identity; second, the connect potential is provided over one of the ten trunks; third, marking pulses are provided over the control pairs 3CP1. A similar three factors provide for the operation of the line expander 900. When the connection is established through the line concentrator 300, the mark pulses are routed back through the control pair 3CP2 as line busy pulses to indicate the connection establishment. The connection establishment indication is provided through the control circuit 600 to the marking control circuit 1304.

When the line expander 900 completes its operation, it also supplies a connection establishment indication through the circuit 600 to the circuit 1304. The connect potential which is supplied to the line expander 900 is not supplied thereto through the trunk 4T1 but through a separate control lead in order to avoid the provision of the connect potential through the line termination 10L04 to the telephone system. When the marking control circuit 1304 receives the two closure indications respectively from the concentrator 300 and the expander 900, it initiates a reset sequence of operations for normalizing the register circuit 1303, the marking control circuit 1304, the trunk selection circuit 1250, the line concentrator 300, the line expander 900 and the circuits 600–19 except for established talking connections. More specifically, when the control circuit 1304 receives the two closure indications, it completes a path for the reset pulses from the generator 1301 to the rest of the circuits in the line concentrator system causing them to return to normal. The only circuits which are changed are due to the establishment of the talking connection which remains locked, as is hereinafter described, under control of a ground potential on the sleeve lead of the line termination 10L04.

As described above, at the same time that the connect potential is provided to the concentrator 300 and to the line expander 900, the trunk control unit 701 is operated to complete the connection through the trunk 4T1. The unit 701 completes its operation after both the line concentrator 300 and the line expander 900 have established connections to the trunk 4T1. When the unit 701 operates, it also removes the connect potential supplied from the circuit 1250. With unit 701 operated, a closed loop is established from the termination 10L04 through the expander 900, unit 701, trunk 4T1 and concentrator 300 to the line 4L04. When unit 701 operates, therefore, a service request or "off-hook" indication appears at the line termination 10L04. Responsive to the service request at the termination 10L04, the telephone system connected thereto seizes the line termination and changes the potential on the sleeve lead S of the termination 10L04 from minus 48 volts to ground potential. The unit 701 times a maximum interval for grounding the sleeve lead of the line termination 10L04 by the telephone system. If the sleeve lead of the line termination 10L04 is not grounded after a predetermined interval from the time a talking connection is established through the line concentrator system, the unit 701 opens the talking connection and initiates a disconnect operation for disconnecting the connections at the line concentrator 300 and the line expander 900. The ground connection on the sleeve lead of the line termination 10L04 locks the talking connection from the line 4L04 through to the line termination 10L04. As long as the sleeve lead is at ground potential the talking connection remains established.

If all of the six trunks in the trunk multiple are busy during the trunk selection sequence of operations, circuit 1250 provides an overflow indication to the marking control circuit 1304 which initiates a reset sequence of operations for returning the line concentrator system to normal. When the control circuit 1304 receives the overflow indication, it completes a path for a reset pulse from the generator 1301 to the register circuit 1303, to the circuits 600–19, to the unit 701, to the concentrators 300–19 and to the expanders 900–19. The reset sequence is exactly the same as that which occurs after the talking connection is established for returning the system to normal and beginning the scanning sequence.

The sequence of operations for a terminating call is exactly the same as that for an originating call except that the service request pulse is provided by one of the line expanders 900–19 instead of by one of the line concentrators 300–19. A service request pulse is provided for a terminating call when the sleeve lead of one of the line terminations is grounded. When the sleeve lead of one of the line terminations 10L00–49 connected to the expander 900 is grounded, a service request pulse is provided from the expander 900 to its associated control circuit 600 where it functions exactly the same as if it had been received from the concentrator 300. The talking connection is held for both originating and terminating calls by the ground potential on the sleeve lead of the line termination utilized in the talking connection.

When the potential on the sleeve lead changes from ground potential to minus 48 volts, a disconnect sequence of operations is initiated for opening the talking connection. For example, if the potential on the sleeve lead on the line termination 10L04 changes to minus 48 volts, a control potential is provided through the expander 900 to the trunk control circuit 7TC0. If, for example, the trunk 4T1 was utilized for the call between the line 4L04 and the line termination 10L04, the line unit 701 opens the trunk 4T1 and completes a path for supplying a disconnect potential from the selection circuit 1250 through the trunk 4T1 to the concentrator 300 and also to the expander 900. In the concentrator 300, the disconnect potential functions to open the connection between the line 4L04 and the trunk 4T1, and in the line expander 900, it functions to open the connection between the line termination 10L04 and the trunk 4T1. After a predetermined interval the trunk unit 701 opens the connection for the disconnect potential from the circuit 1250.

The scanning sequence is not interrupted during the disconnect sequence and lines 4L00–49 and the terminations 10L00–49 are continuously scanned throughout. If a call is being established when the potential on the sleeve lead changes to initiate a disconnect sequence, the unit 701 registers the disconnect request until after the trunk selection circuit 1250 has completed its operation for selecting a trunk, and thereafter the disconnect sequence is completed.

*Detailed description*

Referring to Figs. 3 through 13, when arranged in accordance with Fig. 2, the first digit or digits of each reference number generally indicates the figure in the circuit drawings in which the component appears and the letters of each reference number indicate the function of the component. For example, circuit 6OR is an OR circuit which is shown in Fig. 6.

Twenty line concentrators 300–19 are connected to the central office, shown in Figs. 6 to 13, though only one, the line concentrator 300, is shown in detail. The line concentrator 300 is shown in Figs. 3 through 5, the concentrator 319 is shown functionally as a box in Fig. 5 and the other concentrators 301–18 are not shown. Each of the line concentrators 300–19 provides a connection from fifty subscriber stations 4S00–49 to the central office. Only the stations 4S04 and 4S49 are shown connected to the concentrators 300 and 319. The effect of utilizing a line concentrator is to place a part of the switching equipment of the central office at a remote location in order to conserve outside plant facilities and more efficiently utilize the connections from the subscriber stations to the central office. Each of the line concentrators 300–19 is connected to the central office by ten trunks 4T0–9 and two control pairs or trunks 3CP1–2. Each set of trunks 4T0–9 provides talking paths between the associated one of the line concentrators 300–19 and the central office, and each set of control pairs 3CP1–2 provides signaling paths to and from the central office equipment. With fifty subscriber lines 4L00–49 connected to each of the twenty line concentrators 300–19, there are a total of 1000 subscriber lines which are served by the central office equipment.

In the central office, the twenty sets of ten trunks 4T0–9 are connected, respectively, through twenty individually associated trunk control circuits 7TC0–19 to twenty line expanders 900–19. Each of the line expanders 900–19 functions to establish connections between its associated set of ten trunks 4T0–9 and fifty line terminations 10L00–49. As is hereinafter described, the talking connection between a line and its associated line termination is completed in the trunk control circuit after the operation of the line concentrator and line expander. The line terminations 10L00–49 are associated individually with the subscriber lines 4L00–49 connected to the associated one of the line concentrators 300–19. Each concentrator-expander pair, such as concentrator 300 and expander 900, functions to establish connections from the subscriber lines 4L00–49 connected to the concentrator, through the ten trunks 4T0–9, interconnecting the concentrator and the expander, to the line terminals 10L00–49 connected to the line expander. For example, the line terminal 10L04, which is connected to the line expander 900, is associated with the subscriber line 4L04, which is connected to the concentrator 300. As is hereinafter described, when a call is initiated to or from the subscriber line 4L04 of concentrator 300, the line concentrator system functions to establish a connection from the line 4L04 to the line terminal 10L04 of expander 900.

*Normal scanning*

With all 1000 subscriber lines idle, the central office continuously and synchronously scans the twenty groups of subscriber lines 4L00–49 and their associated line terminals 10L00–49. All the lines and line terminals having a similar designation are scanned at the same time. For example, all twenty lines 4L04 and all twenty line terminations 10L04 are scanned simultaneously.

The twenty line concentrators 300–19 and the twenty line expanders 900–19 are controlled or driven by a scanner pulse generator 1301 which is described in detail in the above-identified disclosure by Joel-Krom-Posin. The scanner pulse generator 1301 simultaneously provides scanning pulses in parallel through twenty concentrator control circuits 600–19 to the twenty line concentrators 300–19 and also to the twenty line expanders 900–19. The circuit 600 is shown in some detail, the circuit 619 is shown functionally and the circuits 601–18 are not shown. The scanning pulses are provided in parallel to the twenty line concentrators 300–19 through the twenty circuits 600–19 and the twenty sets of control pairs 3CP1–2. The concentrator control circuits 600–19 are individually associated with each concentrator-expander pair but the generator 1301 is common to all twenty concentrator-expander pairs. The scanner pulse generator 1301 also supplies some of the scanning pulses to a call register circuit 1303, to twenty trunk control circuits 7TC0–19 and to a marking control circuit 1304, all of which are hereinafter described. The twenty line concentrators 300–19, the twenty line expanders 900–19 and the register 1303 are synchronously and cyclically operated under control of the scanning pulses from the generator 1301.

As shown in Fig. 15, the scanner pulse generator 1301 supplies four types of pulses: vertical group pulses; vertical file pulses; reset pulses; and timing pulses. The vertical file, vertical group and reset pulses are supplied to each of the concentrators 300–19 and to each of the expanders 900–19, but only the vertical group and reset pulses are provided to the register 1303. The vertical group pulses function to identify a group of subscriber lines and the vertical file pulses function to identify the lines in the group. As in ordinary crossbar telephone systems, the subscriber lines are arbitrarily arranged in vertical groups, vertical files and horizontal groups. Such crossbar telephone systems are described, for example, in the above-identified patent granted to A. J. Busch. The subscriber lines 4L00–49, which are connected to each of the twenty line concentrators 300–19, are subdivided into ten vertical groups, each of which includes five vertical files. Each of the vertical group pulses supplied from the scanner pulse generator 1301 selects a group of five lines and their five associated line terminals connected respectively to each of the line concentrators 300–19 and the line expanders 900–19. The vertical group pulse is supplied in parallel to the twenty line concentrators 300–19 so that it functions to select five times twenty or 100 subscriber lines. Between two such vertical group pulses the scanner pulse generator 1301 supplies five vertical file pulses to the concentrators 300–19 and expanders 900–19. One subscriber line, connected to each of the concentrators 300–19 or twenty in all, are scanned by each vertical file pulse. Each vertical file pulse also scans the twenty associated line terminations connected to the expanders 900–19. In order to scan the 1000 lines the scanner pulse generator 1301 provides to each of the twenty line concentrators 300–19, and to each of the twenty line expanders 900–19, ten 15-volt vertical group pulses spaced at intervals of 10 milliseconds and five 15-volt vertical file pulses spaced at intervals of 2 milliseconds between each pair of vertical file pulses. The vertical file and vertical group pulses are ½ millisecond pulses and the complete scanning cycle has a duration of 100 milliseconds.

In addition to the vertical group and vertical file pulses, the generator 1301 supplies one reset pulse at the beginning of the cycle to insure the synchronous operation of the line concentrator and line expander scanning cycles and also of the call register cycle with that of the generator 1301. The reset pulse also functions as the first vertical file pulse so that only forty-nine vertical file pulses are provided instead of fifty during a single cycle.

To recapitulate, during one scanning cycle the pulse generator 1301 supplies one reset pulse, ten vertical group pulses and forty-nine vertical file pulses. One vertical file pulse is provided if the reset pulse is counted as a vertical file pulse for each of the fifty subscriber lines 4L00–49. In addition to the vertical group, vertical file and reset pulses the scanner pulse generator 1301 also supplies fifty timing pulses during each scanning cycle. As is hereinafter described, the timing pulses are utilized when a call is initiated to or from any of the 1000 subscriber lines.

The scanning pulses are provided through leads 13VF, 13VG and 13R which are part of cable 13C, to the twenty concentrator control circuits 600–19. In each of the twenty concentrator control circuits 600–19, the vertical file pulses are provided from lead 13VF through the inhibiting gate 6VFG to the amplifiers 6VF and 9VFA. The inhibiting gate 6VFG is a three-terminal gate which normally permits the passage of positive pulses from its terminal 1 to its terminal 2. When a positive potential is provided to its control terminal 3, the inhibiting gate 6VFG is disabled to block the passage of positive pulses from its terminal 1 to its terminal 2. Such gates are well known in the art and are described, for example, in the above-identified disclosure by Joel-Krom-Posin.

The amplifier 6VF supplies the vertical file pulses through the transformer 6T1, the control pair 3CP1 and the transformer 3T1 to the amplifier 3VFA. The amplifier 3VFA, which is in the line concentrator 300, corresponds to the amplifier 9VFA which receives the vertical file pulses directly from the gate 6VFG. The line expander 900 is similar to the concentrator 300 except for a number of modifications which are hereinafter described in detail.

Just as the vertical file pulses are supplied from the control circuit 600 to both the concentrator 300 and the expander 900, the vertical group and reset pulses are similarly supplied thereto. The vertical group pulses are supplied from the scanner pulse generator 1301 through the lead 13VG, cable 13C and the inhibiting gate 6VGG to the amplifiers 6VG and 9VGA. The amplifier 6VG supplies the vertical group pulses through the transformer 6T2, the control pair 3CP2 and the transformer 3T2 to the amplifier 3VGA. The amplifier 3VGA in the concentrator 300 corresponds to the amplifier 9VGA in the expander 900. The reset pulses are supplied from the pulse generator 1301 through lead 13RS1, cable 13C and the inhibiting gate 6RS1 to the amplifiers 6RS and 9RS. The amplifier 6RS supplies the reset pulse through the transformer 6T2, the control pair 3CP2 and the transformer 3T2 in the line concentrator 300 to the amplifier 3RS. The amplifier 3RS in the concentrator 300 corresponds to the amplifier 9RS in the expander 900. In this manner the vertical file, vertical group and reset pulses are supplied from the scanner pulse generator 1301 through the concentrator control circuit 600 to both the line concentrator 300 and the line expander 900. As described above, the scanning pulses are also supplied in parallel through circuits 601–19 to the concentrators 301–19 and to the expanders 901–19.

In each of the concentrators 300–19 and in each of the expanders 900–19, the scanning pulses function to cyclically drive two ring counters. Each of the concentrators 300–19 includes a pair of counters 3VF and 3VG and each of the expanders includes a pair of counters 9VF and 9VG which are similar to the counters 3VF and 3VG. Such counters are old in the art exemplified by the above-identified disclosure by Joel-Krom-Posin which includes a detailed description of similar ring counters. In the line concentrator 300, the amplified vertical file pulses are supplied from the amplifier 3VFA to an input terminal P of the five-stage vertical file ring counter 3VF. The amplified vertical group pulses are supplied from the amplifier 3VGA through a blocking amplifier 3BVG to an input terminal P of the ten-stage vertical group ring counter 3VG. The amplified reset pulses from the amplifier 3RS are supplied through a blocking amplifier 3BR to reset terminals R of the counters 3VF and 3VG. The counters 3VF and 3VG are stepped, in this manner, by the vertical group and vertical file and reset pulses from generator 1301. The blocking amplifiers 3BFG and 3BR function, respectively, as normal amplifiers for the vertical group and reset pulses. When, however, as is hereinafter described, a line busy or a service request pulse is provided to the central office, the amplifiers 3BFG and 3BR function, respectively, to block the reflection of a pulse through the transformer 3T2 from appearing at the blocking amplifier outputs.

The amplifier 3BR is also connected to the reset terminal R of a flip-flop circuit 3M. The circuit 3M is a bistable device which is set when an input pulse is provided at its terminal 1 and is reset when a pulse is provided at terminal R. The reset pulse insures that the flip-flop circuit 3M is reset at the beginning of each scanning cycle.

As long as there are no service requests from any of the twenty sets of fifty subscriber lines 4L00–49, or a terminating call thereto, the twenty sets of counters, one in each of the line concentrators 300–19, synchronously step through the count of 50, with a reset pulse being supplied at the beginning of each cycle to insure synchronization.

As described above, the vertical file, vertical group and reset pulses are also supplied to the line expanders 900–19 in order to scan the twenty sets of fifty line terminals 10L00–49. In the expander 900, the vertical file, vertical group and reset pulses drive the ring counters 9VF and 9VG which are similar to the ring counters 3VF and 3VG in the line concentrator 300. The vertical file pulses are supplied through the amplifier 9VFA to the terminal P of the ring counter 9VF; the vertical group pulses are supplied through the amplifier 9VGA and the blocking amplifier 9BFG to the input terminal P of the ring counter 9VG; and the reset pulses are supplied through the amplifier 9RS and the blocking amplifier 9BR to the reset terminals of the flip-flop circuit 9M and the counters 9VF and 9VG.

In this manner forty sets of counters are synchronously and cyclically operated by the scanning pulses; one set of counters in each of the twenty concentrators 300–19; and one set of counters in each of the twenty expanders 900–19. As is hereinafter described, in addition to these forty sets of counters a counter 13VGR in the call register circuit 1303 is synchronously operated with the counters 3VG and 9VG.

In the line concentrator 300, at each combination of vertical file and vertical group pulses, a pulse is directed to scan one of the fifty lines 4L00–49 by fifty line scanning units 4SC00–49 which are individually associated therewith. Only unit 4SC04 is shown in some detail and the unit 4SC49 is shown functionally. Each of the line scanning units 4SC00–49 has two gating circuit components, one controlled by the counters 3VF and 3VG and the other controlled by the condition of its associated line. The first gating circuit component which includes the varistor 4D functions as an enabling or readying component for the scanning unit.

The ring counter 3VG functions to successively ready groups of five line scanner units at a time, by changing the reverse bias across the varistor 4D from minus 20 volts to minus 2 volts. When the first stage in counter 3VG is set, a relatively positive potential is provided through resistors 4VG of the five line scanner units 4SC00–04 to the respective varistors 4D. The five varistors 4D in the units 4SC00–04 become biased to allow the passage of pulses from the ring counter 3VF through the associated capacitors 4VF. The varistors 4D in the other forty-five units 4SC05–49 remain reversed biased by the counter 3VG.

The ring counter 3VF provides scanning pulses successively to ten line scanning units at a time, one in each vertical group. When the last counter stage of the counter 3VF, for example, is set, a positive pulse is provided to the capacitors 4VF in the units 4SC04, 4SC09, 4SC14, 4SC19, 4SC24, 4SC29, 4SC34, 4SC39, 4SC44 and 4SC49. Of these, only the unit 4SC04, however, has been readied at this time by the ring counter 3VG. The positive pulse from the last stage of counter 3VF, therefore, is provided through the capacitor 4VF of the unit 4SC04, varistor 4D and capacitor 4C to the varistor 4S. The junction between varistor 4D and capacitor 4C is connected to ground by the resistor 4RD. The varistor 4S is part of the second gating circuit component which is controlled by the line condition.

In the unit 4SC04, the line 4L04 has associated therewith a resistor 4GS, which is connected from the ring lead R to the plus 5-volt battery 4B1, and a resistor 4ES which is connected from the tip lead T to the minus 20-volt battery 4B2. If the subscriber line 4L04 is open, the minus 20-volt battery 4B2 functions, through a resistor 4BT, to reverse bias the varistor 4S so that the scanning pulse from the ring counter 3VF is not transmitted through the varistor 4S. When, however, the subscriber line 4L04 is in a calling condition with the line closed, a circuit is completed from battery 4B1 through resistor 4GS, substation 4S04, and resistor 4ES to battery 4B2. The potential at the junction between varistor 4S and capacitor 4C becomes sufficiently positive to allow the scanning pulse from the last stage of the ring counter 4VF to pass through the varistor 4S and an amplifier 3SR to the lower primary of the transformer 3T2.

The scanning units 4SC00–49, in this manner, allow the vertical file pulses to pass through as service request pulses when both gating circuit components are enabled. The first component, which includes varistor 4D, is enabled by the counter 3VG, and the second component, which includes varistor 4S, is enabled when the associated line is closed. However, when the line 4L04 is connected to one of the trunks 4T0–9 and is therefore in a busy condition, the varistor 4S, as is hereinafter described, is also reverse biased.

If all twenty sets of lines 4L00–49 remain idle, the scanning sequence continues under control of the three sets of pulses; the vertical group, the vertical file and the reset pulses from the central office. Each vertical group pulse readies five line scanning units in each concentrator, and each vertical file pulse scans one of the five lines associated with the readied line scanning units in each concentrator. In this manner, the five readied line scanning units in each concentrator are successively scanned by the five vertical file pulses which occur between two of the vertical group pulses.

At the time position for the first vertical file pulse, the vertical file pulse is actually omitted, as described above, and a reset pulse is transmitted from the central office to insure that the counters 3VG and 3VF are in the start position. When the first stage of counter 3VF is reset, it supplies a scanning pulse to the scanning unit 4LU00.

In each of the twenty expanders 900–19, a similar scanning sequence takes place. In the expander 900, at each combination of vertical file and vertical group pulses, a pulse is directed to scan one of the fifty line terminals 10L00–49 by the fifty scanning units 10SC00–49. Only the details of the unit 10SC04 are shown in the line expander 900 and the unit 10SC49 is shown functionally. The units 10SC00–49, which are somewhat similar to the units 4SC00–49 described above, have two gating circuit components: one controlled by the counters 9VF and 9VG and the other controlled by the condition of the associated one of the line terminations 10L00–49. The first component which includes the varistor 10D functions as an enabling or readying component for the other component which includes the varistor 10S. The counter 9VG successively readies groups of five scanning units at a time by relatively forward biasing five varistors 10D, and the ring counter 9VF successively provides scanning pulses to the five capacitors 10VF in the readied scanner units.

Each of the sleeve leads of the line terminals 10L00–49 is either at ground potential or at a negative potential depending upon the condition of the apparatus connected externally thereto. In the illustrative embodiment of this invention, the sleeve lead is grounded when a service request is provided to the subscriber line associated with the termination and the sleeve lead is normally at a negative potential. The universal concentrator disclosed herein may be utilized with any telephone system which provides for a change in potential at a terminal to initiate a call to the associated subscriber line.

If the line termination is in a service request condition with the sleeve lead grounded, the vertical file pulses are supplied from the counter 9VF through the capacitor 10VF, the varistor 10D, the capacitor 10C and the varistor 10S as service request pulses to the concentrator control circuit 600. The junction between capacitor 10C and varistor 10D is connected to the grounded resistor 10RD. If the sleeve lead S of the line termination 10L04 is grounded, the varistor 10S in the unit 10SC04 is forward biased. The varistor 10S is forward biased because its anode is connected through resistor 10BT to the sleeve lead S of the termination 10L04 and its cathode is connected through resistor 9R4 to the negative potential source 9B4.

The scanning units 10SC00–49, in this manner, allow the vertical file pulses to pass through as service request pulses when both gating circuit components are enabled. The first component, which includes the varistor 10D is enabled by the counter 9VG through resistor 10VG, and the second component, which includes the varistor 10S, is enabled when the associated sleeve S is grounded.

The service request pulse from the scanning unit 10SC04 is supplied through the amplifier 9SR to the concentrator control circuit 600. The service request pulses from the line concentrator 300 are supplied to the control circuit 600 as well as the service request pulses from the expander 900. The service request pulse, initiated when the calling line 4L04 is scanned, is supplied from the unit 4SC04 through the amplifier 3SR, the transformer 3T2 and the control pair 3CP2 to the control circuit 600. A service request pulse can therefore be received from either the line concentrator 300 or the line expander 900 at the concentrator control circuit 600. Either service request pulse initiates a similar sequence of operations in the central office for selecting an idle one of the trunks 4T0–9 which connect the concentrator 300 to the expander 900.

If all twenty sets of lines 4L00–49 and all twenty sets of line terminations 10L00–49 remain idle, the scanning sequence continues under control of the scanning pulses from the generator 1301. In all, as described above there are forty sets of counters; twenty respectively in the line concentrators 300–19 and twenty respectively in the expanders 900–19, which are cyclically and synchronously driven by the generator 1301.

As mentioned above, the call register circuit 1303 is cyclically driven by the generator 1301 together with the concentrators 300–19 and the expanders 900–19. The scanning pulse generator 1301 supplies the vertical group and reset pulses to the circuit 1303. In the circuit 1303 the vertical group pulses are supplied through the inhibiting gate 13VGA to the input terminal P of the ten-stage ring counter 13VGR which is similar to the counters 3VG and 9VG described above. The reset pulses are supplied through the inhibiting gate 13RA and the OR circuit 13OR to the terminal R of the counter 13VGR. The ring counter 13VGR is in this manner cyclically driven with the twenty counters 3VG and the twenty counters 9VG. The circuit 1303 does not include a vertical file ring counter as only the vertical group identity is registered in circuit 1303 when a call to or from one of the substations 3S00–49 is initiated.

*Originating call*

When a call is initiated at one of the substations 4S00–49 connected to the concentrator 300, the vertical file pulse from the ring counter 3VF is transformed, as described above, by the associated one of the scanning units 4SC00–49 to a service request pulse and supplied through the amplifier 3SR to the lower primary winding of transformer 3T2. The amplifier 3SR also supplies a pulse to the blocking amplifier 3BR to prevent a reflected voltage through transformer 3T2 from appearing as a reset pulse. The secondary of the transformer 3T2 is connected through the control pair 3CP2 to the transformer 6T2 in the central office concentrator control circuit 600. The lower primary winding of transformer 6T2 is connected through the receiving amplifier 6SR, the blocking amplifier 6BSR, terminal 1 of the OR circuit 6OR through the circuit 6OR and the inhibiting gate 6SRS to the input terminal of the flip-flop circuit 6HGT. As is hereinafter described, the other input to the OR circuit 6OR is from the service request amplifier 9SR in the expander 900 so that either the concentrator 300 or the expander 900 can supply a service request pulse to the circuit 6HGT.

The inhibiting gate 6SRS normally allows the passage of the service request pulse as its control terminal 3 is connected to the output terminal 2 of the flip flop circuit 6HGT which normally provides the minus 20-volt potential.

With the gate 6SRS open, the circuit 6HGT is operated or set by the service request pulse. The flip-flop circuit 6HGT is a bistable transistor trigger circuit well known in the art exemplified by the above-identified disclosure of Joel-Krom-Posin. A positive pulse applied to the input terminal 1 of circuit 6HGT triggers the circuit from one state to the other and leaves it there until a reset pulse at its terminal 3 triggers it back again to its former state. When the flip-flop circuit 6HGT is normal, or off, its output terminal 2 is at a potential of minus 20 volts. The potential at its output terminal 2 changes to minus 2 volts when it has received a positive pulse through its input terminal 1. A positive pulse through the reset terminal 3 restores the potential at its outupt terminal 2 to minus 20 volts.

The flip-flop circuit 6HGT, which is part of the concentrator control circuit 600, is individually associated with the concentrator 600 and expander 900. The line concentrator system also includes nineteen other flip-flop circuits 6HGT, not shown, which are in the circuits 601–19 and therefore individually associated with the nineteen concentrators 301–19 and also with the nineteen expanders 901–19. The operation of the circuit 6HGT provides an indication, therefore, of the identity of the concentrator expander pair which made the service request.

More specifically when the flip-flop circuit 6HGT in circuit 600 operates, it performs the following functions:

(1) It sets the flip-flop circuit 13RHF in the call register circuit 1303 to register the vertical group identity of the calling line 4L04;

(2) It operates relay 6HGT0 associated therewith to initiate a trunk selection sequence of operations;

(3) It enables the enabling gates 6MG, 6RS2, 6LB1 and 6LB2 in each of the circuits 600–19 to transfer control of the concentrators 300–19 and expanders 900–19 to the marking control circuit 1304; and (4) It disables the inhibiting gates 6VFG, 6VGG and 6RS1 in each of the circuits 600–19 to block the passage of scanning pulses from the generator 1301 to the line concentrators 300–19 and to the line expanders 900–19.

Scanning is stopped due to the disablement of the gates 6VFG, 6VGG and 6RS1, and the control of the line concentrators 300–19 and line expanders 900–19 is shifted to the marking control circuit 1304 due to the enablement of the gates 6MG, 6RS2, 6LB1 and 6LB2. The control terminals 3 of the gates 6VFG, 6VGG, 6RS1, 6MG, 6RS2, 6LB1 and 6LB2 in all twenty circuits 600–19 are multipled to the output terminals 2 of the twenty circuits 6HGT in the circuits 600–19.

In the marking control circuit 1304, the flip-flop circuit 13RHF is set because the output terminal 2 of the flip-flop circuit 6HGT in circuit 600 is connected through lead 13RH, which is part of cable 13C, to the input terminal 1 of the flip-flop circuit 13RHF. When the flip-flop circuit 13RHF is set, it provides a control potential through lead 13SRS, which is part of cable 13C, to disable the inhibiting gates 6SRS in each of the twenty concentrator control circuits 600–19. The inhibiting gates 6SRS, as described above, are in the service request paths from the associated line concentrator and line expander. When the flip-flop circuit 13RHF operates, it also provides a disabling potential to terminals 3 of the inhibiting gates 13RA and 13VGA in the register circuit 1303 causing them to block the vertical group and vertical file pulses to the counter 13VGR. The counter 13VGR is, in this manner, stopped at the vertical group identity of the calling line 4L04.

The counter 13VGR has ten output terminals 0–9 which are connected respectively to the relays 13VGR0–9. With the counter 13VGR stopped at the vertical group identity of line 4L04, which is at vertical group 0, an operating potential is provided to the relay 13VGR0. The other terminal of relay 13VGR0 is multipled to the relays 13VGR1–9 and connected to the lead 13TB. When the relay 6HGT0 operates, it connects battery 6B through its operated armature 3, and lead 13TB, which is part of cable 13C, to the windings of the relays 13VGR0–9. With the other side of the windings of relays 13VGR0–9 connected respectively to the ten terminals 0–9 of the counter 13VGR, as described above, relay 13VGR0 operates. Relays 13VGR1–9 do not operate when the battery 6B is connected thereto upon the operation of relay 6HGT0.

When relay 13VGR0 operates, it in turn operates an associated relay 12VG0 in the trunk selection circuit 1200. There are ten relays 12VG0–9 in the circuit 1200 which are associated individually with the ten register relays 13VGR0–9. When relay 13VGR0 operates, it connects the negative potential source 13B1 through its operated armature to the grounded winding of the relay 12VG0. In this manner when relay 6HGT0 operates responsive to a service request it stops the register 1303 and thereby indirectly initiates the operation of the trunk selection circuit 1250 to select one of the ten trunks 4T0–9 for the call. The relay 6HGT0 also directly controls the operation of the circuit 1250 by operating a relay 12TC and an associated relay 12CN0 both in trunk selection circuit 1200. There are twenty relays 12CN0–9 in the trunk selection circuit 1200 which are associated individually with the twenty concentrator control circuits 600–19. When the relay 6HGT0 in the concentrator control circuit 600 is operated, it operates its associated relay 12CN0 in the circuit 1250. The operating path for the relay 12CN0 is from the grounded operated armature 1 of relay 6HGT0, through lead 6TA0, which is part of cable 11C, and the winding of relay 12CN0 to the negative potential source 12B1. The operating path for relay 12TC is from the grounded winding of relay 12TC through the serially connected normal armatures 1 of six trunk selecting relays 12TS5–0, lead 6TC and the operated armature 2 of relay 6HGT0 in circuit 600 to the negative potential source 6B.

When the relay 12TC operates, it closes operating paths from a trunk control circuit 7TC0 for the preference relays 12TS0–5 in the trunk selection circuit 1250. As is hereinafter described, only one of the preference relays 12TS0–5 remains operated to select the preferred idle one of the trunks 4T0–9 which connect the line concentrator 300 to the line expander 900. When relay 12TC operates, it connects the windings of the six trunk selecting or preference relays 12TS0–5 to the trunk control circuit 7TC0. The connection of the windings of the relays 12TS0–5 is through operated armatures of relays 12TC, 12VG0 and 12CN0, and relay 12CN0, as described above, is individually associated with the line concentrator 300 and the line expander 900. With only relay 12CN0 operated of the twenty relays 12CN0–19, paths from the windings of relays 12TS0–5 are extended only to the trunk control circuit 7TC0 of the twenty trunk control circuits 7TC0–19 which are individually associated with the concentrator expander pairs. The trunk control circuit 7TC0, which is individually associated with the line concentrator 300 and the line expander 900, functions to control the establishment of the talking connection between the calling line 4L04 and its associated line termination 10L04. In fact, as is hereinafter described, the talking connection between the line 4L04 and termination 10L04 is completed in the circuit 7TC0 after the establishment of connections in the line concentrator 300 and line expander 900 to the ends of the selected trunk.

As described above, relay 12VG0 is operated to indicate that the vertical group identity of the calling line 4L04 is 0. The operated one of the relays 12VG0–9 determines which six of the ten trunks 4T0–9 are to be considered for selecting the trunk to establish a talking connection between the calling line 4L04 and the line termination 10L04. The lines 4L00–49 are each connectable to the central office by only six of the ten trunks 4T0–9. The six trunks which are connectable to any one of the lines 4L00–49 are referred to as being in the same trunk multiple. At the line expander 900 the line termination 10L04 is connectable to the same six trunks in the trunk multiple connectable to the line 4L04. The trunks connectable to each line are tabulated in Fig. 14. As indicated in Fig. 14, the five lines in the same vertical group have the same trunk multiple. For example, lines 4L00 and 4L04, which are in the vertical group 0, are connectable to the same six trunks. Fig. 14 illustrates all possible connections between the lines 4L00–49 and the trunks 4T0–9. For the line 4L04, for example, a connection may be established to any one of the trunks 4T0, 4T1, 4T6, 4T7, 4T8 and 4T9. A connection cannot be established from line 4L04 to any one of the trunks 4T2, 4T3, 4T4 and 4T5.

The relays 12TS0–5 function to select an idle preferred one of the six trunks connectable to the calling line 4L04. The relays 12VG0–9 function to select the six trunks in the trunk multiple, and the relays 12TS0–5 function to establish a preference for selecting the six trunks in the trunk multiple. It is necessary for the trunk multiple at the line concentrator 300 and at the line expanedr 900 to be the same as the trunk multiple selected by the operated relay 12VG0 in the trunk selection circuit 1200. In the line concentrator 300 and in the line expander 900, as is hereinafter described, the line circuits 4LU00–49 and 10LU00–49 function, respectively, to determine the trunk multiple.

As indicated in Fig. 14, the trunk preference for line 4L04 is in the following order: 4T0, 4T1, 4T7, 4T6, 4T8 and 4T9. If relay 12TS0 operates after the operation of relay 12TC, it indicates that the preferred trunk, trunk 4T0, in the trunk multiple is idle. If trunk 4T0 is busy, being utilized for another connection, the trunk control circuit 7TC0 does not provide an operating potential to the winding of relay 12TS0. Assume, for example, that trunk 4T0 is busy but that the other five trunks in the trunk multiple are idle. For such a traffic condition, when relay 12TC operates it completes operating paths for the relays 12TS1–5 but not for the relay 12TS0. The operating path, for example, for relay 12TS1 is from ground through the winding of relay 12TS1, the serially connected operated armatures 1 of relays 12TC, 12VG0 and 12CN0 through lead 7TT1, which is part of cable 11C, the normal armature 5 of the trunk relay 7T in the trunk control unit 701, the normal armature 2 of relay 7TH, the normal armature 4 of relay 7SR and resistor 7RS to battery 7B4. Relay 7T is normal when trunk 4T1 is idle. The connections between the armatures of relay 12TC and the armatures of relays 12VG0–9 are shown in tabular form in Fig. 16. The trunk control unit 701 is one of ten control units 700–9 in the trunk control circuit 7TC0 which are individually associated with the trunks 4T0–9 interconnecting the concentrator 300 and the expander 900. With ten control units 700–9 in each of the twenty trunk control circuits 7T0–19 there are 200 control units in all, one for each of the 200 trunks which connect, in groups of ten trunks 4T0–9, the twenty concentrator-expander pairs. The trunks 4T0–9 are normally broken or opened at the control units 701–9. As is hereinafter described, in order to complete a talking connection from one end of a trunk at the concentrator 300 to its other end at the expander 900, it is necessary to operate the relay 7T in the trunk unit associated therewith. The talking paths are normally open at the armatures 2 and 3 of the relays 7T. Relay 7T is operated to complete a talking path and it remains operated for the duration of a call.

Relays 12TS2–5 operate in a manner similar to relay 12TS1, with relay 12TS2 being operated from battery 7B4 in unit 707, relay 12TS3 from unit 706, relay 12TS4 from unit 708 and relay 12TS5 from unit 709.

If all six trunks in the trunk multiple are busy, none of the relays 12TS0–5 operate and an overflow or all-trunks-busy condition results. When relay 12TC operates, it connects ground through its operated armature 6 to the set terminal S of the timer 12TM. The timer 12TM is essentially a flip-flop circuit which is set when its terminal S is grounded and reset when its terminal R is grounded. If the timer 12TM completes its operation, it provides a control potential to terminal 3 of the enabling gate 13TM in the marking control circuit 1304. When the gate 13TM is enabled, it completes a path for the reset pulses to restore the line concentrator system to normal and resume scanning. A random scanning system of the type described in the patent application Serial No. 555,947 filed on December 28, 1955 by Abbott-Joel may be utilized to start the scanning at a random point in the scanning cycle instead of at its beginning.

When the gate 13TM is enabled to complete the reset path, the reset pulse therethrough performs the same functions in restoring the system to normal as is performed by a reset pulse through the gates 13T1 and 13T2 which the gate 13TM parallels. The reset sequence of operations which follows the enablement of gates 13T1 and 13T2 is hereinafter described in detail so that a detailed description of the function of the reset pulse through gate 13TM is unnecessary.

As is hereinafter described, when one of the relays 12TS0–5 is operated, it operates the relay 12TSK to indicate the selection of a trunk and when relay 12TSK operates, it grounds the reset terminal R of the timer 12TM before the timer 12TM has a chance to operate.

When relay 12TS1 operates, it locks operated, and it releases the trunk connect relay 12TC. More specifically, when relay 12TS1 operates, it connects battery 6B in the circuit 600 through the operated armature 2 of relay 6HGT0, lead 6TC, the operated armature 1 of relay 12TS1 to its own winding. Relay 12TC is released because its operating path is through the serially connected armatures 1 of relays 12TS5–0. When relay 12TC releases, it opens the operating paths for relays 12TS0–5 causing relays 12TS2–5 to release. Relay 12TS1 remains operated over its locking path through its operated armature 1. In this manner the lowest designated one of the operated relays 12TS1–5 remains operated to indicate that the trunk 4T1 which is the second preferred trunk in the multiple is idle. The first preferred trunk 4T0, as described above, is assumed to be busy so that relay 12TS0 does not operate. The idle preferred trunk in the multiple is therefore identified.

With only one of the six relays 12TS0–5 operated and with relay 12TC released, an operating path is provided for the relay 12TSK. The operating path for relay 12TSK is from ground through the normal armature 6 of relay 12TC, the normal armature 2 of relay 12TS0, the operated armature 2 of relay 12TS1, the serially connected normal armatures 3 of relays 12TS2–5 and the winding of relay 12TSK to battery 12B2.

When relay 12TSK operates, it disables the timer 12TM before it has a chance to operate by grounding the reset terminal R of the timer 12TM through its operated armature 1.

When relay 12TSK operates, it also supplies a plus 100-volt connect voltage to the tip and ring leads of the selected trunk 4T1 and to the expander 900, and it operates the trunk control unit 701 which is associated with the trunk 4T1. The plus 100-volt connect potential is supplied from the source 12B3 through the operated armature 3 of relay 12TSK to lead M. Lead M is connected by a contact network, not completely shown, in the circuit 1200 to the trunk control circuits 7TC0–19. The contact network includes contacts on relays 12TS0–5, 12VG0–9 and 12CN0–19. The connections between the armatures of these relays are shown in tabulated form in Figs. 16 and 17. With relays 12TS1, 12VG0 and 12CN0 operated, a connection is provided from lead M through the operated armature 5 of relay 12TS1, the operated armature 9 of relay 12VG0 and the operated armature 11 of relay 12CN0, lead 7MA1, which is part of cable 11C, to the trunk control unit 701 in the circuit 7TC0. As described above, the relays 12TS0–5 establish the trunk preference, relays 12VG0–9 identify the vertical group of the calling line and the relays 12CN0–19 identify the concentrator-expander pairs and the circuits 7TC0–19 associated therewith. Fig. 16 illustrates the connections between the armatures 4 and 5 of relays 12TS0–5 to the armatures of relays 12VG0–9 and 12CN0–19, and Fig. 17 illustrates the connections between some of the armatures of relays 12CN0–19 and 12VG0–9. For example, armatures 9 of the relays 12VG0–9 are multiplied, or connected together, with the multiple being connected to each of the armatures 11 of all twenty relays 12CN0–19.

In the trunk control unit 701 the 100-volt positive potential is supplied through lead 7MA1, the normal armature 6 of relay 7T to the resistors 7R1 and 7R2. The resistor 7R1 is connected through the normal armature 2 of the trunk relay 7T and the tip lead T1 of trunk 4T1 to the concentrator 300 and resistor 7R2 is connected through the normal armature 3 of relay 7T and the ring lead R1 of trunk 4T1 to the concentrator 300. The plus 100-volt potential on trunk 4T1 causes the concentrator 300 to establish a connection from line 4L04 to trunk 4T1. The plus 100-volt potential is not supplied over the portion of the trunk 4T1 connected between the unit 701 in circuit 7TC0 and the expander 900. Effectively the trunks 4T0–9 terminate at the units 701–9 in the central office. The plus 100-volt potential is not provided over the trunk 4T1 to the expander 900 in order to avoid connecting the plus 100-volt source 12B3 to the line termination 10L04 when the line expander 900 operates. As is hereinafter described, the expander 900 is operated without utilizing the trunk connect potential by connecting the plus 100-volt potential source from the normal armature 6 of relay 7T through the normal armature 4 of relay 7T and lead 7M1 to the line expander 900. The relay 7T is operated to remove the connect potential and to complete the talking connection at its armatures 2 and 3 after the talking connection has been established through the concentrator 300 and through the expander 900.

At the concentrator 300, the trunk 4T1 is connected to the trunk circuit 4TR1 and through the trunk circuit 4TR1 to the line circuit 4LU04. In the concentrator 300 there are ten trunk circuits 4TR0–9 which are individually connected to the trunks 4T0–9 and there are fifty line circuits 4LU00–49 individually connected to the fifty lines 4L00–49. There is one line circuit for each of the subscriber lines 4L00–49 but details of only the circuit 4LU04 are shown. The counters 3VF and 3VG in the concentrator 300 are set at the identity of the calling line 4L04 because scanning was stopped at the calling line identity. With the counters 3VF and 3VG set at the identity of the calling line 4L04, they function to select the line circuit 4LU04 which is individual to the calling line 4L04. As is hereinafter described, mark pulses are supplied from the central office to initiate the operation of the line circuit 4LU04. The mark pulses together with the plus 100-volt connect potential on the trunk 4T1 initiate the operation of a hereinafter described line unit 4U0 in the line circuit 4LU04 to close a connection between line 4LU04 and trunk 4T1.

When relay 12TSK operates, in addition to connecting the plus 100-volt potential source 12B3 to the trunk 4T1, it also initiates the operation of the marking control circuit 1304. The marking control circuit 1304 functions to steer the timing pulses from the scanner pulse generator 1301 to the line concentrator 300 and to the line expander 900. As is hereinafter described, at the line concentrator 300 and the line expander 900, the mark pulses function to provide control potentials to the line circuit 4LU04 and to a line circuit 10LU4.

When relay 12TSK operates, it connects ground through its operated armature 2 to the control terminal 3 of the enabling gates 13MA, 13LB1A and 13LB2A in the control circuit 1304. When the gate 13MA is enabled it allows the passage of timing pulses from the generator 1301 through lead 13TP to pass through lead 13M which is part of cable C to the concentrator control circuit 600. In the concentrator control circuit 600, the mark pulses from the circuit 1304 through lead 13M pass through the enabled gate circuit 6MG to the line expander 900 and through the amplifier 6M, transformer 6T1 and the control pair 3CP1 to the line concentrator 300. In the line concentrator 300, the mark pulses are supplied from the control pair 3CP1 through the transformer 3T1 and the amplifier 3MK to the flip-flop circuit 3M and to the ten trunk circuits 4TR0–9. As is hereinafter described, the similar sequence of operation occurs in the line expander 900 when mark pulses are received thereat.

When the circuit 3M is set by the first mark pulse, it operates relay 3MR, the winding of which is connected to battery 3B1. When relay 3MR operates, it connects battery 3B1 through its operated armature to the windings of relays 3F0–4 and 3G0–9. The windings of relays 3F0–4 are connected respectively to the output terminals 0–4 of the counter 3VF, and the windings of relays 3G0–9 are connected respectively to the output terminals 0–9 of the counter 3VG. Since, as described above, the counters 3VF and 3VG are set at the identity of the calling line 3L04, relays 3G0 and 3F4 are operated. With any one of the relays 3F0–4 operated and any one of the relays 3G0–9 operated, a minus 65-volt potential source 3B2 is connected to one of the fifty line circuits 4LU00–49. The line circuits 4LU00–04 are associated individually with the subscriber lines 4L00–49. With the counters 3VF and 3VG set at the identity of the calling line 4L04, the mark pulses are effective to select the line circuit 4LU04 which is individually connected to the calling line 4L04.

Each of the line circuits 4LU00–49 has six cross-points or line units 4U0–5 which are connected to the associated subscriber line. The fifty sets of line units 4U0–5 provide for connections between the fifty lines 4L00–49 and the ten trunks 4T0–9. With only six line units 4U0–5 for each line, each line is connectable to only six of the ten trunks 4T0–9. The subscriber lines which are in the same vertical group, as described above, are connectable to the same six trunks. For example, as indicated in Fig. 14, the five lines 4L00–4, which are in the vertical group 0, are connectable to the trunks 4T0, 4T1, 4T6, 4T7, 4T8 and 4T9. As described above, the trunks which are connectable to the lines in a vertical group are referred to as a trunk multiple. All ten trunk multiples are different in order to distribute the load carried by any one trunk. Such a distribution system of multiples is referred to as a slip multiple and is described, for example, in the patent application Serial No. 555,929 of Brooks-Joel-Krom filed on December 28, 1955.

As shown in the line unit 4U0, each of the line units 4U0–5 includes a serially connected relay 4C0 and gas tube 4CT. When the relay 4C0 is operated, a connection is provided from the associated line to the associated trunk. When relays 3F4 and 3G0 are operated, the minus 65-volt battery 3B2 is connected to the line circuit 4LU04. The battery 3B2 is connected through the operated armature of relay 3F4 and the operated armature 4 of relay 3G0 to the windings of the six relays 4C0 in the line circuit 4LU04. The anode of the gas tube 4CT in each of the units 4U0–5 is connected to one of the trunk circuits 4TR0–9 in accordance with the table shown in Fig. 14. The connection from the anode of tube 4CT is through a varistor 4DT and resistors 4R5 and 4R9 to the ring and tip of the trunk. For example, the gas tube 4CT in the line unit 4U0 of circuit 4LU04 is connected through the circuit 4TR1 to the trunk 4T1. The tube 4CT ionizes and the associated relay 4C0 operates when a positive potential is provided on the tip T1 and ring R1 of the trunk 4T1, and the negative potential from battery 3B2 is connected to the line circuit 4LU04. The combination of the minus 65 volts at the cathode of the tube 4CT and the plus 100 volts at the anode of the tube 4CT in unit 4U0 of circuit 4LU04 causes the ionization of the tube 4CT. When the tube 4CT ionizes, relay 4C0 operates to establish a connection through the unit 4U0 from the calling line 4L04 to the selected trunk 4T1. When the unit 4U0 of circuit 4LU04 is operated, the mark pulses which are still being supplied from the central office are returned as line busy pulses through the control pair 3CP2 to the central office. When relay 4C0 operates, it forward biases a diode 4M2 in the circuit 4TR1 to allow for the passage of the mark pulses. The diode 4M2 is normally reverse biased by the battery 4B4 which is connected thereto through the resistor 4L1, the varistor 4RV and the resistor 4B. The other terminal of varistor or diode 4M2 is connected to ground through the resistor 4M and to the output of the amplifier 3MK through the capacitor 4C1. As described above, the mark pulses are received in the line concentrator 300 by the amplifier 3MK which supplies them to the trunk circuits 4TR0–9.

When relay 4C0 operates, it extends the connection from the battery 3B2 through the operated armature 4 of relay 4C0, varistor 4RV and resistor 4L1 to the battery 4B4 locking relay 4C0 operated. The current through resistor 4L1 causes the potential at the varistor 4M2 to decrease and allow the passage of mark pulses. With the varistor 4M2 forward biased, the next mark pulse from the central office through the amplifier 3MK is supplied through the capacitor 4C1, varistor 4M2 and capacitor 4CD to the line busy amplifier 3LB. The line busy amplifier 3LB supplies the amplified pulse through the transformer 3T2 and control pair 3CP2 to the central office. The amplified pulses are also supplied from the amplifier 3LB to the blocking oscillator 3VG to prevent the reflection of the line busy pulse through the transformer 3T2 as a vertical group pulse.

In this manner when the connection has been established between the calling line 4L04 and the selected trunk 4T1, succeeding mark pulses are routed back to the central office as line busy pulses which indicate the connection establishment.

In the circuit 4TR1, the battery 4B5 is connected through the inductor 4BE and the operated armature 3 of relay 4C0 to reverse bias the varistor 4S in the scanning unit 4SC04. When scanning is thereafter resumed the line 4L04 does not initiate a service request during the time it is connected to the trunk 4T1. The scanning pulse from the counter 3VF is directed through the capacitor 4VF, varistor 4D, capacitor 4C, the operated armature 3 of relay 4C0, varistor 4M1 and the amplifier 3LB to the control pair 3CP2. When scanning is resumed, therefore, the scanning pulse is returned as a line busy pulse to the central office.

Returning to the sequence of operations for establishing a connection between the line 4L04 and the trunk 4T1, the converted mark pulses are supplied through the control pair 3CP2 to the transformer 6T2 in the circuit 600. In the circuit 600, the converted mark pulses are supplied through the amplifiers 6LB and 6BLB, the enabled gate circuit 6LB1, lead 13LB1 which is part of cable 13C, the enabled gate circuit 13LB1A in the circuit 1304 to set the flip-flop circuit 13LB1B. When the circuit 13LB1B is set, it enables the gate circuit 13T2 which is part of a reset path from the scanner pulse generator 1301. The reset path also includes the enabling gate 13T1 which is enabled, as is hereinafter described, under control of the line expander 900 just as the enabling gate circuit 13T2 is enabled under control of the line concentrator 300.

In the line expander 900, as described above, the mark pulses from the concentrator control circuit 600 are supplied to the amplifier 9MK. A concurrent sequence of operations occurs in the line expander for establishing a connection between line terminal 10L04 and the trunk 4T1, as that for establishing a connection from the line 4L04 to the trunk 4T1. In the expander 900 the mark pulses are supplied from the amplifier 9MK to set the flip-flop circuit 9M and to the trunk circuits 10TR0–9 which are individually associated with the trunks 4T0–9. When the flip-flip circuit 9M is set, it operates the relay 9MR which in turn operates the relays 9F4 and 9G0. The winding of relay 9MR is connected to battery 9B1 and the windings of the relays 9F4 and 9G0 are connected to the output terminals of the counters 9VF and 9VG. Relays 9F4 and 9G0 are operated when relay 9MR operates because the counters 9VG and 9VF are set at the line identity. The relays 9F4 and 9G0 actually identify the line termination 10L04 which is the same as the identity of the calling line 4L04. When the relays 9F4 and 9G0 operate, the minus 65-volt battery 9B2 is connected through the operated armature of relay 9F4, the operated armature 4 of relay 9G0 to the line units 10U0–5 in the line circuit 10LU04. The line circuits 10LU00–49 are associated individually with the line terminations 10L00–49 and each of the circuits 10LU00–49 has six line units 10U0–5. The line units 10U0–5 are similar to the line units 4U0–5, described above, and function to connect each of the line terminations 10L00–49 to six of the ten trunks 4T0–9.

As described above, when the plus 100-volt potential is supplied from the trunk selection circuit 1200 to the line concentrator 300, it is also supplied to the line expander 900. The plus 100-volt potential is supplied through the normal armatures 6 and 4 of the trunk relay 7T in unit 701 of circuit 7TC0 through lead 7M1 to the trunk circuit 10TR1 in the line expander 900. In the circuit 10TR1 the connect potential is supplied through the varistor 10DR to the anode of tube 10CT in the unit 10U0 of the line circuit 10LU04. With minus 65 volts at the cathode of tube 10CT and plus 100 volts at the anode of tube 10CT, tube 10CT ionizes and relay 10C0, connected in series therewith, operates. When relay 10C0 operates, it locks operated to battery 10B4 in circuit 10TR1, it connects trunk 4T1 to the line termination 10L04 and causes the mark pulses to be routed back to the control circuit 600 as line busy pulses to indicate the crosspoint closure.

When relay 10C0 operates, it forward biases a diode 10M2 in the circuit 10TR1 to allow for the passage of the mark pulses. The diode 10M2 is normally reverse biased by the battery 10B4 which is connected thereto through the resistor 10L1, the varistor 10RV and the resistor 10B. The other terminal of varistor or diode 10M2 is connected to ground through the resistor 10M and to the output of the amplifier 9MK through the capacitor 10C1. As described above, the mark pulses are received in the expander 900 by the amplifier 9MK which supplies them to the trunk circuits 10TR0–9.

When relay 10C0 operates, it extends the connection from the battery 9B2 through the operated armature 4 of relay 10C0, varistor 10RV and resistor 10L1 to the battery 10B4 locking relay 10C0 operated. The current through resistor 10L1 causes the potential at the varistor 10M2 to decrease and allow the passage of mark pulses. With the varistor 10M2 forward biased, the next mark pulse from the circuit 600 through the amplifier 9MK is supplied through the capacitor 10C1, varistor 10M2 and capacitor 10CD to the line busy amplifier 9LB. The line busy amplifier 9LB supplies the amplified pulse through the enabling gate 6LB2 in circuit 600, lead 13LB2, which is part of cable 13C, the enabling gate 13LB2A in circuit 1304 to set the flip-flop circuit 13LB2B. The line busy pulse to the marking control circuit 1304 from the expander 900 indicates that the expander 900 has established a connection from the termination 10L04 to the trunk 4T1. The talking connection from line 4L04 to termination 10L04 is complete except at the trunk control circuit 7TC0.

As is hereinafter described, when the circuit 13LB2B is operated it initiates a reset sequence for returning the line concentrator system to normal except for established talking paths.

In the line expander 900, when the unit 10U0 in the circuit 10LU04 is operated, it functions to change the biasing of the scanning unit 10SC04. When the circuit 10U0 is operated, the battery 10B5 in the trunk circuit 10R1 is connected through the inductor 10BE and the operated armature 3 of relay 10C0 in unit 10U0 to reverse bias the varistor 10S in the scanning unit 10SC04. When scanning is thereafter resumed the line termination 10L04 tests busy during the time that it is connected to the trunk 4T1. The scanning pulse from the counter 9VF is directed through the capacitor 10VF, varistor 10D, capacitor 10C, the operated armature 3 of relay 10C0, varistor 10M1 and the amplifier 9LB to the control circuit 600. When scanning is resumed, therefore, the scanning pulse to the line expander 900 is returned as a line busy pulse to the control circuit 600.

To summarize briefly the sequence of operations thus far described for establishing a talking connection between the calling line 4L04 and its associated line termination 10L04, scanning is stopped at the line identity in the concentrators 300–19, expanders 900–19 and register 1303, and the trunk selection circuit 1250 selects one of the ten trunks which connect the concentrator 300 to the central office. A connect potential is provided from the selection circuit 1250 through the trunk control circuit 7TC0 for operating the line concentrator 300 to establish a connection between line 4L04 and the selected trunk 4T1 and also for operating the line expander 900 to establish a connection between the termination 10L04 and trunk 4T1. The talking connection is not, however, completed as the trunk control unit 701 in the circuit 7TC0 must be operated to complete the talking path through the trunk 4T1. As described above, the trunk 4T1 is normally open at the armatures 2 and 3 of relay 7T in the trunk control unit 701. When, as hereinafter described, relay 7T is operated, it removes the connect potential from the ring R1 and tip T1 of trunk 4T1, and it completes the talking connection. Relay 7T is operated through a sequence of operations which initiates with the operation of the relay 12TSK in the circuit 1250 at the same time that the trunk selection circuit 1250 supplies the plus 100-volt connect potential to the concentrator 300 and to the expander 900.

At the same time that the trunk selection circuit 1250 supplies the plus 100-volt connect potential to the line concentrator 300, and to the line expander 900, it also connects battery 12B5 through its operated armature 4 to lead P. Lead P is connected through a contact network in circuit 1250 to the lead 7P1 which is connected to the trunk control unit 701. Referring to Figs. 16 and 17, lead P is connected through the operated armature 4 of relay 7TS1, the operated armature 17 of relay 12VG0, the operated armature 21 of relay 12CN0 through lead 7P1, which is part of cable 11C, to the control unit 701 of circuit 7TC0. In the control unit 701 the connection of battery 12B5 to lead 7P1 initiates the operation of the 10-second timer 7TMA and it sets the flip-flop circuit 7TM1. After a 10-second interval, the timer 7TMA functions to reset the flip-flop circuit 7TM1. The timer 7TMA functions to reset the trunk control unit 701 in the event the potential at the sleeve lead of the line termination 10L04 does not change from minus 48 volts to ground. The sleeve lead is at ground potential when the termination 10L04 has been seized by the telephone system, line finder or line link frame, etc., not shown, which is connected thereto. In other words, the timer 7TMA functions after a predetermined interval to break the talking connection if the telephone system does not respond to the closure indication achieved by the operation of unit 701 and ground the sleeve lead of the termination or terminal 10L04.

When the flip-flop circuit 7TM1 is set, it operates the relay 7TH, the winding of which is connected between the output terminal 2 of circuit 7TM1 and the negative potential source 7B7. When relay 7TH operates, it extends ground through its operated armature 1 to a diode network which controls a timing flip-flop circuit 7TM2. The diode network includes two varistors or diodes 7V2 and 7V1 which are connected respectively to the set and reset terminals 1 and 3 of the timing flip-flop circuit 7TM2. The varistor 7V2 is normally reversed biased, with its cathode connected to the minus 24-volt potential source 7B6 through the resistor 7R7 and its anode connected to the negative potential source 10B5 through the resistor 7R5, lead 7S1 and the resistor 10BE. The varistor 7V1 is normally forward biased due to the connection between the minus 48-volt potential source 7B5 and the minus 48-volt potential source 10B5. The anode of varistor 7V1 is connected through the resistor 7R4 to the source 7B5 and its cathode is connected to the source 10B5 through the resistor 7R6, lead 7S1 and resistor 10BE. The varistors 7V1 and 7V2 control the passage of timing pulses, illustrated in Fig. 15, from the generator 1301.

Timing pulses are supplied from the scanner pulse generator 1301 through lead 13TP to the coupling capacitors 7C3 and 7C4. The capacitor 7C3 is connected through the varistor 7V2 to the set terminal 1 of circuit 7TM2 and the capacitor 7C4 is connected through the varistor 7V1 to the reset terminal 3 of the circuit 7TM2. Each timing pulse is normally supplied through the capacitor 7C3 and varistor 7V1 to the reset terminal 3 of the circuit 7TM2. The circuit 7TM2 is therefore normally maintained in a reset condition.

When relay 7TH operates, it grounds the junction between the resistors 7R5 and 7R6 to change the biasing of varistors 7V1 and 7V2. The grounded armature 1 functions to forward bias the varistor 7V2 to allow the timing pulses to set the circuit 7TM2 and it reverse biases the varistor 7V1 to prevent resetting the circuit 7TM2. The varistor 7V2 is forward biased as the potential at its anode is increased to ground potential and the varistor 7V1 is reverse biased as the potential at its cathode is increased to ground potential. The next timing pulse, which follows the operation of relay 7TH through lead 13TP, sets the circuit 7TM2. When the circuit 7TM2 is set, it operates the trunk relay 7T the winding of which is connected between terminal 2 of the circuit 7TM2 and the battery 7B1. When relay 7T operates, it opens at its armatures 2 and 3 the path from the plus 100-volt potential source 12B3 to the concentrator 300 and at its armature 4 the path from the source 12B3 to the expander 900, it completes the talking connection through trunk 4T1 also at its operated armatures 2 and 3, it transfers at its armature 5 a connection to ground instead of a connection to battery 7B4 so that trunk 4T1 will test busy to circuit 1250, and it completes at its grounded armature 1 an operating path for relay 7SR.

The timing flip-flop circuit 7TM2 operates relay 7T after the concentrator 300 and expander 900 are operated. If relay 7T operates before the crosspoints in concentrator 300 and expander 900 are closed they remain open because the connect potential is removed when relay 7T operates. The delay provided by circuits 7TM1 and 7TM2 insures the closing of the crosspoints 4U0 and 10U0 before the operation of relay 7T. When relay 7SR operates, it readies a locking path to ground at the armature 5 of relay 12TSK from battery 7B2 through the operated armature 1 of relay 7SR and lead 12SR. The operation of relay 7SR also readies at its armature 2 a path for applying a disconnect potential from source 12B4 to the selected trunk 4T1 at the completion of the call. The sequence of operations for disconnecting the talking connection is hereinafter described as well as the function of the readied locking path for relay 7SR.

The circuit 7TM2 and relays 7T and 7SR remain operated as long as the junction between resistors 7R5 and 7R6 is grounded. As described above, when this junction is grounded, the timing pulses from the generator 1301 are routed to the set terminal 1 of the circuit 7TM2 instead of to its reset terminal 3. When the talking connection is completed by the relay 7T the line termination 10L04 is seized by the ordinary telephone system, not shown, which is connected thereto. The telephone system grounds the sleeve lead of the line termination 10L04 when it is seized. The sleeve lead of the line termination 10L04 is connected through the resistor 10BT, the operated armature 3 of relay 10C0 in the line unit 10U0 of circuit 10LU04 and lead 7S1 to the junction between resistors 7R5 and 7R6. As long as the sleeve lead of the termination 10L04 is grounded the connection between the line 4L04 and the line termination 10L04 remains established.

As described above, when the sleeve lead of the line termination 10L04 is grounded, it serves ordinarily to forward bias the varistor 10S in the scanning unit 10SC04. When, however, the line circuit 10LU04 has been operated, a connection is provided from the varistor 10S through the operated armature 3 of relay 10C0 and the resistor 10BE to the negative battery 10B5. The varistor 10S therefore remains reverse biased when the sleeve lead is grounded as long as relay 10C0 remains operated. If relay 10C0 is not operated and the sleeve lead of the termination 10L04 is grounded it initiates, as is hereinafter described, a terminating call sequence of operations. The potential, which is provided through lead 7S1 to the junction between resistors 7R5 and 7R6, actually is at minus 24 volts and not at ground potential. The minus 24 volts maintain the varistor 7V2 forward biased to keep the circuit 7TM2 operated. The junction between resistors 7R5 and 7R6 is at minus 24 volts because lead 7S1 is connected on one side through resistor 10BE to the minus 48-volt battery 10B5 and on the side through the resistor 10BT to ground potential on the sleeve lead of the line termination 10L04.

In this manner when the sleeve lead of the line termination 10L04 is grounded, the varistor 10S in the unit 10SC04 remains reverse biased by the battery 10B5 and the varistor 7V2 remains forward biased. When, as is hereinafter described, the ground potential is removed from the sleeve lead of the line termination 10L04 and the minus 48-volt potential is applied thereto, the talking connection through the line concentrator system is disconnected. The line concentrator 300, line expander 900 and circuit 7TC0 remain operated, in this manner, with the talking path through the concentrator 300, trunk 4T1, control unit 701 in circuit 7TC0 and expander 900 remaining established until it is disconnected when either of the parties hangs up.

As described above, when the concentrator 300 and expander 900 operated to establish connections, crosspoint closure check signals are sent to the marking control circuit 1304. In the circuit 1304, the check signals operate the flip-flop circuits 13LB1B and 13LB2B to initiate a normalizing operation. When the flip-flop circuits 13LB1B and 13LB2B are operated, they enable the gates 13T2 and 13T1 to complete a reset path from the generator 1301 for the call register circuit 1303, the marking control circuit 1304, the concentrators 300–19 and the expanders 900–19. As described above, the gate 13T2 is enabled when a crosspoint closure indication is received from the line concentrator 300 and the gate 13T1 is enabled when a crosspoint closure indication is received from the line expander 900.

With the gates 13T1 and 13T2 enabled, the next reset pulse supplied by the scanner pulse generator 1301 passes through the gates 13T1 and 13T2 to the reset terminals 3 of the flip-flop circuits 13LB1B and 13LB2B causing them to reset. When the circuits 13LB1B and 13LB2B reset they remove the enabling potentials at the control terminals of the gates 13T2 and 13T1 disabling the reset path from the generator 1301. In this manner only a single reset pulse is provided through the gates 13T1 and 13T2. The reset pulse through the gates 13T1 and 13T2 also resets the flip-flop circuit 13RHF and the ring counter 13VGR both in the call register circuit 1303. The counter 13VGR is reset because the reset pulse is provided through the OR circuit 13OR to the reset terminal R thereof. Since the counter 13VGR was at position 0 for the call from line 4L04, it remains there when the reset pulse is applied thereto. As is hereinafter described, the relay 13VGR0 is released when relay 6HGT0 is released during the reset sequence of operations.

The reset pulse is also provided from the control circuit 1304 through lead 13LB2 which is part of cable 13C, the enabled gate 6RS2 to the line expander 900 and also through the amplifier 6RS, transformer 6T2 and the control pair 3CP2 to the line concentrator 300. As described above during the normal scanning sequence, the reset pulse received in the concentrator 300 resets the flip-flop circuit 3M and the counters 3VR and 3VG returning the line concentrator 300 to normal or to its zero position in the scanning cycle except for the fact that the line unit or crosspoint 4U0 in the line circuit 4LU04 remains closed to establish the connection between the calling line 4L04 and the selector trunk 4T1.

In the line expander 900 the reset pulse similarly resets the flip-flop circuit 9M and the counters 9VF and 9VG to return the expander 900 to its normal or zero position in the scanning cycle. All twenty of the concentrators 300–19 and all twenty of the expanders 900–19 are reset in this manner because the reset lead 13LB2 is multipled to each of the twenty control circuits 600–19.

The reset pulse that is provided through lead 13RS2 to the control circuit 600 to reset the concentrator 300 and expander 900 is also provided in the circuit 600 to the reset terminal 3 of the flip-flop circuit 6HGT. When the circuit 6HGT is reset, it releases relay 6HGT0, it disables gates 6MG, 6RS2, 6LB1 and 6LB2 in each of the circuits 600–19 to block the pulsing paths from the circuit 1304, and it enables the gates 6VFG, 6VGG and 6RS1 in each of the circuits 600–19 to open the paths for the scanning pulses from the pulse generator 1301. With the control shifted in this manner from the circuit 1304 to the generator 1301, normal scanning of the twenty sets of lines 4L00–49 and line terminations 10L00–49 is resumed.

When relay 6HGT0 releases, it in turn releases relay 13VGR0 in the register 1303 by opening its operating path through lead 13TB, it releases the relay 12CN0 in the circuit 1250 by opening its operating path through lead 6TA0, and it releases relay 12TS1 in circuit 1250 by opening its locking path through lead 6TC. When relay 13VGR0 releases, it in turn releases its associated relay 12VG0, and when relay 12TS1 releases, it releases the relay 12TSK. Relay 12TSK opens the path from the plus 100-volt potential source 12B3 and readies a path from the minus 130-volt disconnect potential source. The disconnect sequence of operations is hereinafter described.

*Terminating calls*

The sequence of operations for a terminating call in the universal line concentrator system is exactly the same as the sequence for an originating call except that the service request is initiated at one of the line expanders 900–19 instead of at one of the line concentrators 300–19. A terminating call is initiated when the sleeve lead of one of the line terminations 10L00–49 is grounded. If, for example, the sleeve lead of the line termination 10L04 of the line expander 900 is grounded it forward biases the varistor 10S in the scanning unit 10SC04 which is associated with the line termination 10L04. The varistor 10S is forward biased because its cathode is connected to the battery 9B4 through the resistor 9R4. The line circuit 10LU04, which is associated with the line termination 10L04, is of course not operated when the service request is initiated as the line termination 10L04 is not connected to its associated subscriber line 4L04. With the terminating call initiated in this manner to the line 4L04 by grounding the sleeve lead of the line termination 10L04, the next time the line termination 10L04 is scanned by the arrival of a pulse from terminal 4 of the counter 9VF to the unit 10SC04, a service request pulse is provided to the control circuit 600. The pulse from the counter 9VF is supplied through the capacitor 10VF, the varistor 10D which is forward biased by the counter 9VG at this time, the capacitor 10C, the varistor 10S and the amplifier 9SR to the circuit 600.

As described above, in the description of the normal scanning sequence and also in the description of an originating call sequence, the service request pulse is supplied through an OR circuit 6OR and an inhibiting gate 6SRS to set the flip-flop circuit 6HGT. In this manner the service request pulse from the line expander 900 sets the flip-flop circuit 6HGT in the circuit 600 to initiate the exact sequence of operations for halting the scanning and for selecting a trunk as was initiated by a service request pulse from the concentrator 300 which also set the circuit 6HGT.

*Disconnect*

As described above, the talking connection through the line concentrator system is held by the grounded sleeve lead of the line termination through which the talking path is connected. For example, if the talking connection is for the subscriber line 4L04, it is held established through the line termination 10L04 as long as the sleeve lead of the line termination 10L04 is grounded.

When the potential on the sleeve lead of the line termination 10L04 is changed from ground potential to minus 48 volts, the biasing of the varistors 7V2 and 7V1 is changed. As described above, as long as the ground potential is on the sleeve lead of the line termination 10L04, the varistor 7V2 remains forward biased and the varistor 7V1 reversed biased to keep the timing flip-flop circuit 7TM2 in its operated or set condition. When the potential on the sleeve lead of the line termination 10L04 changes to minus 48 volts, the minus 48-volt potential is provided through the resistor 10BT, the operated armature 3 of relay 10C0, lead 7S1 to the junction between the resistors 7R5 and 7R6. The resistor 7R5 is connected to the varistor 7V2 which is also connected to the minus 24-volt battery 7B6 through the resistor 7R7. The varistor 7V2 is, in this manner, reversed biased to open the set path for the timing pulses from the scanner pulse generator 1301 through lead 13TP to the set terminal 1 of the circuit 7TM2. The minus 48-volt potential at the junction between resistors 7R5 and 7R6 also forward biases the varistor 7V1 which is connected to the reset terminal 3 of the circuit 7TM2 and to the resistor 7R6. With the varistor 7V1 forward biased the next timing pulse through lead 13TP from the generator 1301 resets the circuit 7TM2. When the circuit 7TM2 resets, it releases the trunk relay 7T which opens the talking connection at its armatures 2 and 3 through the trunk 4T1. It is assumed that the trunk which was selected and utilized for the talking connection is the trunk 4T1, as described above, for the originating call. When the relay 7T releases, it also removes the operating ground at its armature 1 for the slow release relay 7SR which begins to release. Before the relay 7SR releases, however, a minus 130-volt disconnect potential source 12B4 is connected through the normal armature 6 of relay 12TSK, lead 12NA, the operated armature 2 of relay 7SR to the resistors 7R1 and 7R2 and also to the normal armature 4 of relay 7T. The resistors 7R1 and 7R2 are connected, respectively, through the normal armatures 2 and 3 of relay 7T to the tip T1 and ring R1 of the trunk 4T1 which is connected to the concentrator 300. The normal armature 4 of relay 7T, to which the disconnect potential is also connected, extends through the lead 7M1 to the line expander 900. In this manner, during the time that the relay 7T is released and relay 7SR is not yet released, a disconnect potential is provided through the trunk 4T1 to the line concentrator 300 and through the lead 7M1 to the line expander 900.

In the line concentrator 300 and in the line expander 900 similar sequences of operations take place for releasing the line circuits 4LU04 and 10LU04. The talking connection has already been broken at the trunk control unit 701 when relay 7T released. The disconnect potential through trunk 4T1 is supplied through the resistors 4R5 and 4R9 and varistor 4D2 to the cathode of the gas tube 4DT. The anode of the tube 4DT is connected through the resistor 4L1 to battery 4B1 so that the tube 4DT ionizes upon the application of the disconnect potential thereto. When the tube 4DT ionizes, its anode potential reduces to reverse bias the varistor 4RV and open the locking path through the varistor 4RV for the connect relay 4C0 in the line unit 4U0 of the circuit 4LU04. The locking path for relay 4C0, as described above during the sequence for establishing the connection, is from battery 4B4 through resistor 4L1, varistor 4RV, the operated armature 4 of relay 4C0 through the winding of relay 4C0 and resistor 4CT1 to ground. When the relay 4C0 releases, it opens at its armatures 1 and 2 the connection from the line 4L04 to the trunk 4T1.

In the line expander 900 a similar sequence of operations occurs when a disconnect potential is provided on lead 7M1. The disconnect potential on lead 7M1 is connected through the varistor 10D2 to the cathode of the disconnect tube 10DT. The anode of the tube 10DT is connected through the resistor 10L1 to the battery 10B4 so that the tube 10DT ionizes. When the tube 10DT ionizes it reverse biases the varistor 10RV to open the locking path for the connect relay 10C0 of the unit 10U0 in the circuit 10LU04. The locking path for the relay 10C0 is from battery 10B4 through resistor 10L1, varistor 10RV, the operated armature 4 of relay 10C0, the winding of relay 10C0 and resistor 10CT1 to ground. When relay 10C0 releases, it opens at its armatures 1 and 2 the connections from the line termination 10L04 to the trunk 4TI. The talking connection is in this manner opened at three different places: in the trunk control unit 701 of circuit 7TC0; in the line circuit 4LU04 of the concentrator 300; and in the line circuit 10LU04 of the expander 900.

When relay 7SR finally releases, it opens the connection from the disconnect battery 12B4 to remove the minus 138 volts from the trunk 4T1 and from the lead 7M1. When the disconnect potential is removed from the trunk 4T1 the tube 4DT returns to normal and when the disconnect potential is removed from lead 7M1 the tube 10DT returns to normal.

The line scanning sequence is uninterrupted during the disconnect sequence of operations. If a talking connection is being established when the ground potential is removed from the sleeve lead of the line termination 10L04 and relay 12TSK has been operated to indicate that a trunk has been selected, the disconnect potential is held up. If relay 12TSK is operated when relay 7T releases during the disconnect sequence the relay 7SR does not release. Relay 7SR remains operated over a locking path through its operated armature 1 and lead 12SR and the operated armature 5 of relay 12TSK to ground. The relay 7SR remains operated to register the fact that the trunk 4T1 is to be disconnected. Thereafter, when relay 12TSK is released, it connects the disconnect battery 12B4 through the trunk control unit 701 to complete the disconnect sequence of operations.

Numerous other arrangements may be devised by those skilled in the art without departing from the spirit and scope of the invention. For example, the number of lines may be more or less than fifty connected to each of the line concentrators 300–19 and there may be more or less than twenty line concentrators 300–19. It is evident therefore that the above-described arrangement is only illustrative of the application of the principles of the invention.

What is claimed is:

1. In a switching system for establishing connections between two sets of individually associated terminals where each of said terminals in said two sets has at least two conditions, means for cyclically and synchronously scanning said two sets of terminals to determine the condition of said terminals in each of said sets, and means responsive to a change in condition of any one of said terminals in either of said sets for establishing a connection between said changed condition terminal and said associated terminal in the other of said sets.

2. In a switching system for establishing connections between two sets of individually associated lines with each of the lines having a normal and a service request condition, means for cyclically and synchronously scanning said two sets of lines to determine the condition of each of said lines in said two sets of lines, a plurality of connections less in number than the number of said lines in each of said sets of lines, means responsive to the initiation of a service request condition at any one of said lines in either of said sets of lines for selecting one of said connections, and means controlled by said selecting means for establishing a connection from said service requesting line which is in one set through said selected connection to said associated line in said other set.

3. A switching system comprising two sets of individually associated terminals with each of said terminals having at least a normal and a request condition, means for synchronously scanning said two sets of terminals, means responsive to a change from said normal condition to said request condition at any one of said terminals in either of said sets of terminals for halting the operation of said scanning means to register the identity of said changed condition terminal, means controlled by said register means for establishing a connection between said changed condition terminal and said associated terminal, and means effective after the operation of said connection establishing means for re-starting said scanning means.

4. A switching system comprising a plurality of lines, a plurality of line terminations individually associated with said lines, a plurality of paths less in number than said plurality of lines, a first switching network connected between said paths and said lines, a second switching network connected between said paths and said line terminations, means for cyclically and synchronously scanning said lines and said line terminations, and means associated with said second network and controlled by said scanning means for selecting an available one of said paths and for operating said first and said second networks to extend connections from the ends of said selected path, said selecting and operating means including means for determining the availability of said paths.

5. A universal line concentrator comprising a central office, a plurality of subscriber lines, a plurality of concentrator trunks extending from said central office and being less in number than said plurality of lines, a remotely located line concentrator for establishing talking connections between said lines and said trunks, a plurality of line appearances at said central office, said line appearances being individually associated with said subscriber lines, an expander at said central office for establishing talking connections between said trunks and said line appearances, means at said line concentrator for cyclically scanning said subscriber lines, means at said expander for cyclically scanning said line appearances, means at said central office and controlled by said concentrator scanning means and by said expander scanning means for concurrently operating said line concentrator and said line expander.

6. In combination, a plurality of subscriber lines, a plurality of trunks less in number than said plurality of lines, a remote line concentrator for establishing connections between said lines and said trunks, a central office to which said trunks are connected, a plurality of line terminations at said central office individually associated with said subscriber ines, a line expander at said central office for establishing connections between said terminations and said trunks, a line scanning system located partially in said concentrator and partially in said central office for determining the service condition of each of said lines at said concentrator and each of said terminations at said central office and for supplying an indication of said determined conditions of said lines to said central office, means at said central office and controlled by said scanning system for operating said line concentrator and said line expander.

7. A universal line concentrator comprising a central office, a line concentrator located at a distance from said central office, a plurality of subsccriber lines terminating at said line concentrator, a line expander at said central office, a plurality of line terminations connected to said line expander and individually associated with said subscriber lines, at least one concentrator trunk connected between said line concentrator and said line expander, means for scanning said lines and said line terminations to detect service requests initiated thereat, and means effective upon the detection of a service request by said scanning means for concurrently operating said line concentrator and said line expander for completing a talking connecting through said concentrator trunk between any one of said lines and said associated line termination.

8. A universal line concentrator comprising a central office, a line concentrator located at a distance from said central office, a plurality of subscriber lines terminating at said line concentrator, a line expander at said central office, a plurality of line terminations connected to said line expander and individually associated with said subscriber lines, a plurality of concentrator trunks less in number than said plurality of lines connected between said line concentrator and said line expander, means for scanning said lines and said line terminations to detect service requests initiated thereat, means effective upon the detection of a service request at any one of said lines by said scanning means for selecting an idle one of said trunks, and means controlled by said selecting means for operating said line concentrator and said line expander to complete a talking connection from said calling line through said selected trunk to said line termination associated with said calling line.

9. A universal line concentrator comprising a central office, a line concentrator located at a distance from said central office, a plurality of subscriber lines terminating at said line concentrator, a line expander at said central office, a plurality of line terminations connected to said line expander and individually associated with said subscriber lines, a plurality of concentrator trunks less in number than said plurality of lines connected between said line concentrator and said line expander, means for scanning said lines and said line terminations to detect service requests initiated thereat, means at said central office effective upon the detection of a service request at any one of said lines by said scanning means for halting the operation of said scanning means, means in said line concentrator effective when said scanning system is halted for registering the identity of said service requesting line, means in said line expander effective when said scanning means is halted for registering the identity of said service requesting line, means in said central office effective when said scanning means is halted for selecting an idle one of said trunks, means controlled by said selecting means for supplying an indication of the selection to said line expander and to said line concentrator, switching means in said line concentrator controlled by said concentrator register means and effective upon the reception of said trunk selection indication for connecting said calling line to said selected trunk, and switching means in said line expander controlled by said expander register means and effective upon the reception of said trunk selection indication for connecting said selected trunk to said line termination associated with said calling line.

10. A universal line concentrator in which a number of subscriber lines are connected by a line concentrator to a smaller number of trunks extending from a central office comprising circuit means at said concentrator providing access from each of said lines to a combination of said trunks, a number of line appearances at said central office which are individually associated with said subscriber lines, circuit means at said central office providing access from each of said line appearances to the same combination of said trunks accessible to said associated line, means at said central office for determining the identity of said trunks accessible to any one of said lines and said associated line appearance, means at said central office and controlled by said determining means for selecting an idle one of said trunks, and means at said central office controlled by said selecting means for concurrently operating said concentrator circuit means and said central office circuit means.

11. A universal line concentrator in which a number of subscriber lines are connected by a line concentrator to a smaller number of trunks extending from a central office comprising circuit means at said concentrator providing access from each of said lines to a combination of said trunks, a number of line appearances at said central office which are individually associated with said subscriber lines, circuit means at said central office providing access from each of said line appearances to the same combination of said trunks accessible to said associated line, means at said central office for determining the identity of said trunks accessible to any one of said lines and said associated line appearance, means at said central office and controlled by said determining means for selecting an idle one of said trunks, means at said central office controlled by said selecting means for concurrently operating said concentrator circuit means and said central office circuit means, means for cyclically and synchronously scanning said subscriber lines and said line appearances, and means responsive to the initiation of a service request at any one of said lines or at any one of said line appearances for operating said determining means.

12. A switching system comprising a first plurality of terminals at one location, a second plurality of terminals individually associated with said first plurality of terminals at another location, a first crosspoint network for establishing one of a plurality of possible connections to each of said first plurality of terminals, a second crosspoint network for establishing one of a plurality of possible connections to each of said second plurality of terminals, a plurality of trunks less in number than said first plurality of terminals but more in number than said first plurality of connections to each of said first plurality of terminals, each of said trunks being connected between said first network and said second network, means associated with said first plurality of terminals responsive to a change in condition at any one of said terminals in either said first or said second plurality of terminals for determining which of said trunks are connectable by said first network to said changed condition terminal, means associated with said first plurality of terminals and controlled by said determining means for selecting an idle one of said trunks, and means associated with said first plurality of terminals and controlled by said selecting means for concurrently operating said first and said second networks to establish a connection between said changed condition terminal and said terminal associated with said changed condition terminal.

13. A universal line concentrator comprising a central office, a line concentrator located at a distance from said central office, a plurality of subscriber lines terminating at said line concentrator, a line expander at said central office, a plurality of line terminations connected to said line expander and individually associated with said subscriber lines, a trunk control circuit at said central office for establishing a connection from said trunks, to said line expander, a plurality of concentrator trunks less in number than said plurality of lines connected between said line concentrator and said trunk control circuit, means for scanning said lines and said line terminations to detect service requests initiated thereat, means at said central office effective upon the detection of a service request at any one of said lines by said scanning means for halting the operation of said scanning means, means in said line concentrator effective when said scanning system is halted for registering the identity of said service requesting line, means in said line expander effective when said scanning means is halted for registering the identity of said service requesting line, means in said central office effective when said scanning means is halted for selecting an idle one of said trunks, means controlled by said selecting means for supplying a connect potential through said trunk control circuit and over said selected trunk to said line concentrator, switching means in said line concentrator controlled by said concentrator register means and effective upon the reception of said connect potential for connecting said calling line to said selected trunk, means controlled by said selecting means for supplying an indication of the trunk selection to said line expander, switching means in said line expander controlled by said expander register means and effective upon the reception of said trunk selection indication for connecting said selected trunk to said line termination associated with said calling line, and means effective after the operation of said line concentrator and said line expander for operating said trunk control circuit to complete the talking connection from said calling line to said associated line termination.

14. A universal line concentrator comprising a central office, a line concentrator located at a distance from said central office, a plurality of subscriber lines terminating at said line concentrator, a line expander at said central office, a plurality of line terminations connected to said line expander and individually associated with said subscriber lines, a trunk control circuit at said central office for establishing a connection from said trunks to said line expander, a plurality of concentrator trunks less in number than said plurality of lines connected between said line concentrator and said trunk control circuit, means for scanning said lines and said line terminations to detect service requests initiated thereat, means at said central office effective upon the detection of a service request at any one of said lines by said scanning means for halting the operation of said scanning means, means in said line concentrator effective when said scanning system is halted for registering the identity of said service requesting line, means in said line expander effective when said scanning means is halted for registering the identity of said service requesting line, means in said central office effective when said scanning means is halted for selecting an idle one of said trunks, means controlled by said selecting means for supplying a connect potential through said trunk control circuit and over said selected trunk to said line concentrator, switching means in said line concentrator controlled by said concentrator register means and effective upon the reception of said connect potential for connecting said calling line to said selected trunk, means controlled by said selecting means for supplying an indication of the trunk selection to said line expander, switching means in said line expander controlled by said expander register means and effective upon the reception of said trunk selection indication for connecting said selected trunk to said line termination associated with said calling line, means effective after the operation of said line concentrator and said line expander for operating said trunk control circuit to complete the talking connection from said calling line to said associated line termination, and means for disconnecting the talking connection between said calling line and said associated line termination including means for releasing said trunk control circuit to open said talking connection thereat, means for supplying a disconnect potential over said selected trunk to said line concentrator, and means for providing a disconnect indication to said line expander.

15. In a switching system, two sets of individually associated terminals, each of said terminals having two different electrical conditions, a plurality of switching devices interconnecting said two sets of terminals to form a plurality of possible paths from each of said terminals in one of said sets to the associated one of said terminals in the other of said sets, means responsive to a change in condition of one of said terminals in either of said sets for selecting one of said possible paths, and means effective after the operation of said selecting means for establishing a connection between said changed condition terminal and its associated terminal in the other one of said sets.

16. A universal line concentrator comprising a central office, a line concentrator located at a distance from said central office, a plurality of subscriber lines terminating at said line concentrator, a line expander at said central office, a plurality of line terminations connected to said line expander and individually associated with said subscriber lines, a plurality of trunks connected between said line concentrator and said line expander, means for scanning said lines and said line terminations to detect service requests initiated thereat, means at said central office effective upon the detection of a service request at any one of said lines by said scanning means for halting the operation of said scanning means, means in said central office effective when said scanning means is halted for selecting an idle one of said trunks, means at said central office and controlled by said selecting means for operating said line concentrator and said line expander to establish a talking connection between said calling line and said line termination associated with said calling line, and effective upon the operation of said line concentrator and said line expander for restarting said scanning means.

References Cited in the file of this patent

UNITED STATES PATENTS

| | | |
|---|---|---|
| 2,057,868 | Wochinger | Oct. 20, 1936 |
| 2,542,079 | Grundin et al. | Feb. 20, 1951 |
| 2,715,656 | Andrews | Aug. 16, 1955 |
| 2,774,822 | Dunlap et al. | Dec. 18, 1956 |